US011189283B2

(12) United States Patent
Tran et al.

(10) Patent No.: US 11,189,283 B2
(45) Date of Patent: Nov. 30, 2021

(54) FREEFORM CONVERSATION WRITING ASSISTANT

(71) Applicant: MICROSOFT TECHNOLOGY LICENSING, LLC, Redmond, WA (US)

(72) Inventors: Tracy ThuyDuyen Tran, Seattle, WA (US); Daniel Parish, Seattle, WA (US); Ajitesh Kishore, Kirkland, WA (US); James Patrick Spotanski, Seattle, WA (US); Keri Diane Talbot, Sammamish, WA (US); Kiruthika Selvamani, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/572,554

(22) Filed: Sep. 16, 2019

(65) Prior Publication Data
US 2021/0082419 A1 Mar. 18, 2021

(51) Int. Cl.
*G10L 15/22* (2006.01)
*G06F 40/56* (2020.01)
*G09B 7/00* (2006.01)

(52) U.S. Cl.
CPC .............. *G10L 15/22* (2013.01); *G06F 40/56* (2020.01); *G09B 7/00* (2013.01); *G10L 2015/223* (2013.01); *G10L 2015/225* (2013.01)

(58) Field of Classification Search
None
See application file for complete search history.

(56) References Cited

U.S. PATENT DOCUMENTS

| 10,708,216 B1* | 7/2020 | Rao ..................... G06Q 50/01 |
| 2005/0142529 A1* | 6/2005 | Andreyev ............... G09B 7/00 434/362 |

(Continued)

FOREIGN PATENT DOCUMENTS

| CN | 110134466 A | 8/2019 |
| WO | 2014197730 A1 | 12/2014 |

OTHER PUBLICATIONS

"International Search Report and Written Opinion Issued in PCT Application No. PCT/US20/037968", dated Oct. 1, 2020, 12 Pages.

*Primary Examiner* — Jakieda R Jackson
(74) *Attorney, Agent, or Firm* — NovoTechIP International PLLC

(57) ABSTRACT

In a device including a processor and a memory, the memory includes executable instructions that cause the processor to control the device to perform functions of receiving a user input to initiate a conversation session for generating an outline for a writing; generating a voice output asking a question regarding the writing; receiving a voice input from the user responding to the voice output; identifying, based on the received voice input, content of the voice input responding to the voice output; repeating, until a predetermined condition is met, the steps of generating the voice output, receiving the voice input, and identifying the content of the voice input, wherein the question asked via each voice output is generated in response to the content of the voice input responding to the preceding voice output; and generating, based on the content of the voice inputs, the outline for the writing.

16 Claims, 14 Drawing Sheets

(56) References Cited

U.S. PATENT DOCUMENTS

| | | | | |
|---|---|---|---|---|
| 2006/0105303 | A1* | 5/2006 | Ames | G09B 19/00 434/165 |
| 2006/0228689 | A1* | 10/2006 | Rajaram | G09B 5/14 434/350 |
| 2007/0166684 | A1* | 7/2007 | Walker | G09B 7/02 434/322 |
| 2007/0218449 | A1* | 9/2007 | Reck | G09B 19/00 434/350 |
| 2008/0026360 | A1* | 1/2008 | Hull | G09B 7/00 434/324 |
| 2011/0239129 | A1* | 9/2011 | Kummerfeld | G06F 3/0488 715/750 |
| 2012/0196253 | A1* | 8/2012 | Duvall | G09B 7/00 434/156 |
| 2013/0179766 | A1* | 7/2013 | Madnani | G06F 40/169 715/230 |
| 2014/0036023 | A1* | 2/2014 | Groen | H04N 7/147 348/14.01 |
| 2014/0335497 | A1* | 11/2014 | Gal | G09B 5/08 434/323 |
| 2015/0104763 | A1* | 4/2015 | Hausmann | G09B 7/04 434/169 |
| 2016/0048514 | A1* | 2/2016 | Allen | G06F 16/24522 707/731 |
| 2016/0179788 | A1* | 6/2016 | Clark | G06F 40/284 704/9 |
| 2017/0109448 | A1* | 4/2017 | Adamy | G06F 16/9535 |
| 2017/0178531 | A1* | 6/2017 | Swank | G09B 7/08 |
| 2017/0337838 | A1* | 11/2017 | Elkon | G06F 3/048 |
| 2018/0349336 | A1* | 12/2018 | German | G06F 40/174 |
| 2019/0272323 | A1* | 9/2019 | Galitsky | G06F 40/30 |

* cited by examiner

```
                  1200
                                     ┌─ 1210
         ┌──────────────────────────────────┐
         │ RECEIVING A USER INPUT TO INITIATE A │
         │ CONVERSATION SESSION FOR GENERATING AN │
         │      OUTLINE FOR A WRITING       │
         └──────────────────────────────────┘
                          │
                          ▼
                                     ┌─ 1220
         ┌──────────────────────────────────┐
         │ GENERATING A VOICE OUTPUT ASKING A QUESTION │
         │        REGARDING THE WRITING     │
         └──────────────────────────────────┘
                          │
                          ▼
                                     ┌─ 1230
         ┌──────────────────────────────────┐
         │  RECEIVING A VOICE INPUT FROM THE USER │
         │     RESPONDING TO THE VOICE OUTPUT;    │
         └──────────────────────────────────┘
                          │
                          ▼
                                     ┌─ 1240
         ┌──────────────────────────────────┐
         │ IDENTIFYING, BASED ON THE RECEIVED VOICE INPUT, │
         │ CONTENT OF THE VOICE INPUT RESPONDING TO THE │
         │            VOICE OUTPUT          │
         └──────────────────────────────────┘
                          │
                          ▼
                                     ┌─ 1250
                      ╱ IS A PREDETERMINED ╲
              NO ────╱   CONDITION MET?    ╲
                     ╲                     ╱
                      ╲                   ╱
                          │ YES
                          ▼              ┌─ 1260
         ┌──────────────────────────────────┐
         │ GENERATING, BASED ON THE CONTENT OF THE │
         │ VOICE INPUTS, THE OUTLINE FOR THE WRITING │
         └──────────────────────────────────┘
```

FIG. 12

FREEFORM CONVERSATION WRITING ASSISTANT

BACKGROUND

For many people, writing is a challenging and intimidating process. Especially, for those who are not trained, expressing themselves or communicating with others via writing can be difficult and time-consuming, and the end result may not always convey what the writers initially intended. Hence, many writers experience a "blank page" problem—they know that they need to produce a document, but cannot transfer the idea in their mind to a blank piece of paper because they normally do not have a clear idea of how different ideas are correlated and how all the ideas should be structured for effective writing. Additionally, most writing tools, e.g., word processing applications, are built for a sequential process, meaning that writers need to have a pretty good idea of what they are going to write, including structural organization, before proceeding to actual writing using such writing tools. Hence, those writing tools are not geared to help those unexperienced and untrained writers formulate ideas or assist the writing process. Various tools have been developed to assist writers to transfer the idea in their mind to a document. Most of such tools require the writers to type using a keyboard or touchpad. However, many people find it difficult to use their hands or fingers to express the ideas in their mind. Especially, for those who are not familiar with computers, the fact that they need to interact with a computer using a keyboard or other user interface can make it more intimidating and frustrating to use those computer-aided writing assistance tools. As such, there still remain significant areas for new and improved implementations for assisting people to transfer their ideas to writing.

SUMMARY

In an implementation, a device includes a processor and a memory in communication with the processor. The memory includes executable instructions that, when executed by the processor, cause the processor to control the device to perform functions of receiving a user input to initiate a conversation session for generating an outline for a writing; generating a voice output asking a question regarding the writing; receiving a voice input from the user responding to the voice output; identifying, based on the received voice input, content of the voice input responding to the voice output; repeating, until a predetermined condition is met, the steps of generating the voice output, receiving the voice input, and identifying the content of the voice input, wherein the question asked via each voice output is generated in response to the content of the voice input responding to the preceding voice output; and generating, based on the content of the voice inputs, the outline for the writing.

In another implementation, a non-transitory computer readable medium contains instructions which, when executed by a processor, cause a computer to perform functions of receiving a user input to initiate a conversation session for generating an outline for a writing; generating a voice output asking a question regarding the writing; receiving a voice input from the user responding to the voice output; identifying, based on the received voice input, content of the voice input responding to the voice output; repeating, until a predetermined condition is met, the steps of generating the voice output, receiving the voice input, and identifying the content of the voice input, wherein the question asked via each voice output is generated in response to the content of the voice input responding to the preceding voice output; and generating, based on the content of the voice inputs, the outline for the writing.

In another implementation, a method of operating a device for providing a writing assistant service, includes receiving a user input to initiate a conversation session for generating an outline for a writing; generating a voice output asking a question regarding the writing; receiving a voice input from the user responding to the voice output; identifying, based on the received voice input, content of the voice input responding to the voice output; repeating, until a predetermined condition is met, the steps of generating the voice output, receiving the voice input, and identifying the content of the voice input, wherein the question asked via each voice output is generated in response to the content of the voice input responding to the preceding voice output; and generating, based on the content of the voice inputs, the outline for the writing.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 12 illustrates a flow diagram of a method of operating the system for providing a writing assistant service according to an implementation.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This description is directed to a writing assistant system configured to generate a document for a user without requiring the user to write down or type his or her thoughts and ideas for a writing. The system may be configured to have a conversion session with the user, and such verbal conversion may be proceeded such that the user may freely express the ideas and thoughts in his or her mind without worrying about how the ideas and thoughts are correlated or how the writing should be structured. Based on the conversation with the user, the system may collect and process the user's ideas and thoughts and generate an outline or summary, which the user can refer to or rely on when proceeding to writing. The system may collect the user's idea and thoughts via a turn-based freeform conversation with the user. For example, the system may verbally generate a question for the user and then listens to the user's answer to the question. In response to the user's answer, the system may generate another question relevant to the user's answer. Such turn-based conversation may continue until a predetermined condition is met. By repeating verbally asking the user a question and listening to the user's answer, the assistant tool can collect the user's ideas and thoughts for a writing and determines how the user's thoughts and ideas are correlated and the writing should be structured. The assistant tool then generates an outline or summary that lists the ideas and thoughts in a structured manner. Hence, the user does not need to have a clear idea about what he or she is going to write about, how his ideas and thoughts are correlated, how his or her writing should be arranged or structured, etc. Accordingly, the system may solve the "blank page" problem that many people encounter. Also, the system may provide a technical solution to a technical problem that there is no effective writing assistant tool that can verbally communicate with a user and generate an outline or summary even if such user does not have a clear idea on what he or she is going to write in advance, how the user's ideas and thoughts are correlated, how the user's ideas and thoughts should be structure for writing.

Figure 1:
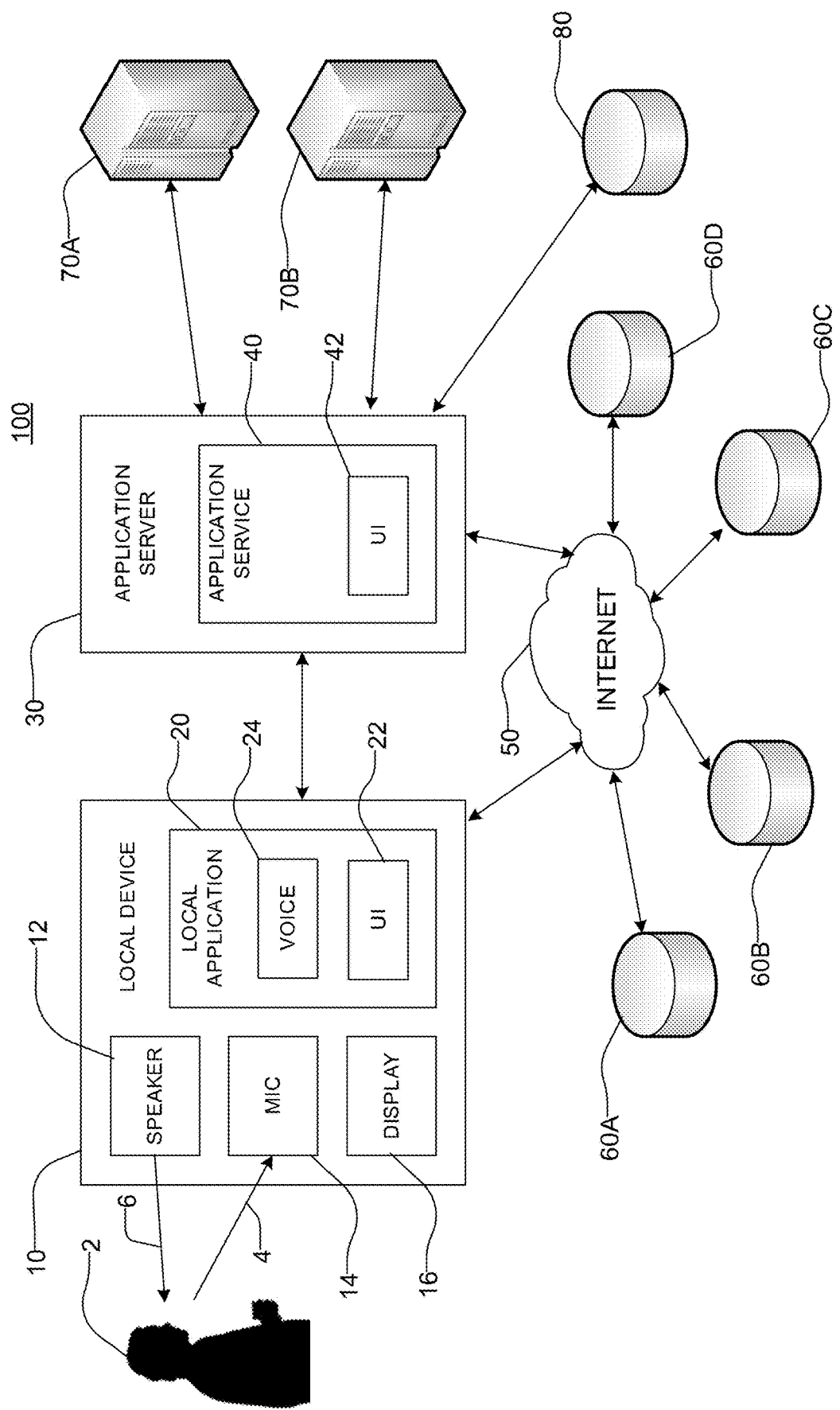
FIG. 1 illustrates an implementation of a system for providing a writing assistant service.

With this overview, attention is now turned to the figures to described various implementations of the presenting teachings. FIG. 1 illustrates an implementation of a system 100 for providing a writing assistant service to a user 2. The system 100 may include a local device 10, an application server 30 and various data sources, such as internet resources 50 (e.g., an internet encyclopedia, associated content store, etc.), data resources (e.g., web sites/web pages 60A, contacts/directory databases 60B, maps 60C, accounts 60D, etc.), artificial intelligent (AI) engine 70A, deep learning (DL) engine 70B, structured content store 80, etc.

The local device 10 is representative of any physical or virtual computing system, device, or collection thereof, such as a smart phone, laptop computer, tablet computer, desktop computer, hybrid computer, gaming machine, smart television, entertainment device, Internet appliance, virtual machine, wearable computer, as well as any variation or combination thereof. The local device 10 may operate remotely from the application server 30, and hence may communicate with each other by way of data and information exchanged over a suitable communication link or links. The local device 10 may implement all or portions of the functions to carry out the writing assistant service. The local device 10 may host, be integrated with, or be in communication with some or all of the data sources. For example, the local device 10 may be in communication with the web sites/web pages 60A, contacts/directory databases 60B, maps 60C and accounts 60D (collectively "data resources 60" hereinafter) via the internet resources 50. The local device 10 may be in communication with the AI engine 70A, DL engine 70B and structured content store 80 via the application server 30.

The local device 10 may include various user interface devices, such as, a speaker 12, microphone 14, display 16, etc. The local device 10 may host a local application 20 configured to perform the writing assistant service for the user 2. The local application 20 may include a voice recognition/generation module ("voice module" hereinafter)

24 to allow the user 2 can verbally converse with the system 100. For example, the voice module 24 may perform speech recognition processes to translate the voice input received via the microphone 14 to digital data that the system 100 can understand and process. The voice module 24 may also perform grammatical analysis to determine context of the voice input 4 from the user 2. The context of the voice input 4 may then be processed by the system 100, which may in turn generate a question for the user 2, which may be output as a voice via the speaker 6. The local application 20 may continue such turn-based conversation with the user 2 until a predetermined condition is met. Then, the local application 20 may generate, based on the answers received from the user 2, an outline or summary for his or her writing. The answers collected from the user 2 may be used for other purposes to achieve different outcomes. For example, based on the answers, the local application 20 may generate a concept map, flowchart, story board, chronicle, etc., which may be used to effectively carry out a meeting, brainstorm session, story/script development, investigation, note-taking, etc. Such outcome may be graphically rendered to be displayed via the display 16 in real-time or after the session, printed out on a paper via a printer, or converted to an image or document file format.

The local application 20 is representative of any software application, module, component, or collection thereof, capable of implementing user interface 22 (and corresponding productivity tool). Examples of applications in which the writing assistant tool may be provided include, but are not limited to, word processing applications, spreadsheet applications, presentation applications, web browsers, email applications, blogging and micro-blogging applications, social networking applications, and gaming applications.

In an implementation, the local application 20 may be a browser-based application that executes in the context of a browser application. For example, the local application 20 may execute in the context of or in association with a web page, web site, web service, or the like. However, the local application 20 may also be a locally installed and executed application, a streamed application, a mobile application, or any combination or variation thereof. The local application 20 may be implemented as a standalone application or may be distributed across multiple applications.

The application server 30 is representative of any physical or virtual computing system, device, or collection thereof, such as, a web server, rack server, blade server, virtual machine server, or tower server, as well as any other type of computing system, which may be, in some scenarios, implemented in a data center, a virtual data center, or some other suitable facility. The application server 30 may operate an application service 40, which may implement all or portions of the functions to carry out the writing assistant service. The application service 40 may host, be integrated with, or be in communication with various data sources such as the internet resources 50, data resources 60, AI engine 70A, deep learning (DL) engine 70B, structured content store 80, etc.

The application service 40 may be any software application, module, component, or collection thereof capable of providing an application service to the local application 120. In some cases, the application service 40 is a standalone application providing a productivity tool for assisted content authoring. In some cases, the application service 40 includes a productivity application (or other application) for which the writing assistant tool may be provided. Examples of productivity applications (and other applications) for which assisted content authoring may be provided include, but are not limited to, word processing applications, spreadsheet applications, presentation applications, web browsers, email applications, blogging and micro-blogging applications, social networking applications, and gaming applications.

The features and functionality provided by the local application 20 and application service 40 can be co-located or even integrated as a single application. In addition to the above mentioned features and functionality available across application and service platforms, aspects of the described writing assistant service may be carried out across multiple devices on a same or different computing devices. For example, some functionality for the writing assistant service may be provided by the local application 20 on the local device 10 and the local application 20 may communicate by way of data and information exchanged between with the application server 30 or other devices.

The local application 20 may carry out various functions for providing the writing assistance service to the user 2. For example, the user 2 may indicate, via a user interface of the local device 10, that the he or should would like to initiate a conversation-based writing assistant session. The local application 20 may then initiate a turn-based verbal conversation with the user 2 by asking a question and listening to the user's answer to the question. Based on the context of the user's answer, the local application 20 may generate and ask another question, which may be directed to asking more details about the user's answer, asking about the reasons why the user 2 feels the way that he or she indicated in the answer, asking about other reasons or examples, asking about an inconsistency between the user's answers, etc. This turn-based verbal conversation may continue until a predetermined condition is met, such as, the user 2 does not have any more to say or the local application 20 determines that the user 2 has provided enough content to generate an output line or summary for a writing that the user 2 wants to work on. Once such conversion is completed, the local application 20 may generate, based on the context of the answers that the user 2 has provided, an outline or summary, which may be output via the display 16 or printed out as a document. The user 2 may then rely on or refer to the outline or summary when he or she initiate a writing.

As such, the user 2 may not need to write down anything on a piece of paper or manipulate a device to figure out what he or she wants to write, how he or she is going to write or how the writing should be arranged or structured. Instead, the user 2 can create an outline or summary for his or her writing by having a conversation with the local device 10. Hence, this description provides a technical solution to the "writer's block" problem that many people encounter. Also, the system 100 can provide a technical solution to a technical problem that there is no effective writing assistant tool that can verbally communicate with a user and generate an outline or summary even if such user does not have a clear idea on what he or she is going to write in advance, how the user's ideas and thoughts are correlated, how the user's ideas and thoughts should be structure for writing.

To guide the user 2 more effectively, the system 100 may be configured to determine whether the answers from the user 2 are relevant to the subject of the writing or to the preceding question. The system 100 may also be configured to determine whether a statements made in the answers from the user 2 are accurate. Such relevancy and accuracy determination may be done by the local device 10 alone or in communication with the application service 30, internet resources 50, data resources 60, AI engine 70A, DL engine 70B, structured content store 80, etc. For example, the system 100 may process a voice input 4 from the user 2, which answers a question asked in a voice output 6 from the system 100, and determine content of the voice input 4. Then, the system 100 determine whether the content of the voice input 4 is relevant to the question by, for example, operating the AI engine 70A to analyze both the question and answer. When the AI engine 70A cannot ascertain the relevancy, the system 100 may generate a follow-up voice output asking another question that may cause the user 2 to provide another voice input to clarify his or her previous answer. Based upon the clarifying answer, the system 100 may determine a relevancy of the user's previous answer to the previous question asked by the system 100.

Regarding accuracy of the user's answer, once the content of the voice input 4 is determined, the system 100 may perform searches on various data sources, such as internet resources 50, data resources 60, structured content store 80, etc. to determine whether the content (e.g., the metric system is less error prone than the imperial system) of the voice input 4 is factually accurate. If the content is determined to be factually incorrect, the system 100 may generate a follow-up voice output 6 indicating that the content of the voice input 6 is inaccurate. An example of such relevancy and accuracy determination process is described below with references to FIGS. 7A, 7B, 8A and 8B.

Also, the system 100 may use the AI engine 70A, DL engine 70B, etc. to formulate a conversation scenario for the user 20. For example, the DL engine 70B may be provided with previous session data from previous conversation sessions with the user 2 or other users. Form the previous session data, the DL engine 80B may have learned types of questions that have caused the users to provide answers having relevancy issues. The DL engine 80B may also have learned how questions should be formulated and prioritized to effectively drive the conversation session. Such information may then be shared with the AI engine 70A such that the system 10 can more effectively and efficiently carry out the conversation session with the user 2. For example, the DL engine 70B might have learned, from the prior sessions, that it is better to start with asking formality of the writing (e.g., a writing type, writing length, etc.) than letting the user 2 drive the conversation. Also, the DL engine 70B might have learned a common question pattern that led the user 2 to provide incorrect answers or led the system 100 to produce an incorrect outline This information may be shared with the AI engine 70A, such that the AI engine 70A can generate a plan or strategy for carrying out the conversation session with the user 2. The system 100 may also be operated to generate a predetermined set of questions. For example, the system 100 may be operated as a writing training tool for students and a teacher may program system 100 to guide the students to write about a specific topic or subject and ask specific questions related to the topic or subject such that the students can think about the questions and provide answers. When the conversation session is over, the students may be provided with an outline of what they talked about, which may help the students understand how their ideas are correlated to each other and how their ideas can be structured or organized.

FIG. 2A to FIG. 10C describe an implementation of the system 100 that collect the ideas and thoughts of the user 2 via a turn-based conversation by receiving, from the user, a voice input responding to a preceding question and generating, based on the voice input from the user 2, a new voice output asking another questions. The system 100 may plan and structure the conversation such that each question asked to the user 2 is selected and prioritized based on the precedent voice input. Hence, even if the user 2 does not have a clear idea on what he or she wants to write about or how his or her writing should be structured, simply by answering the questions asked by the system 100, the user 2 may provide information necessary for the system 100 to prepare an outline for the writing.

Figure 2A:
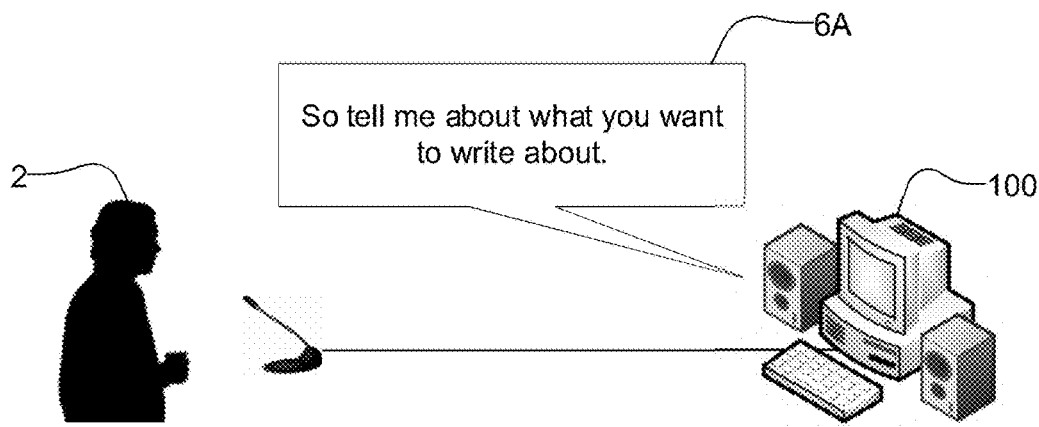
FIG. 2A illustrates the system generating a first voice output to ask the user a first question.
Figure 2B:
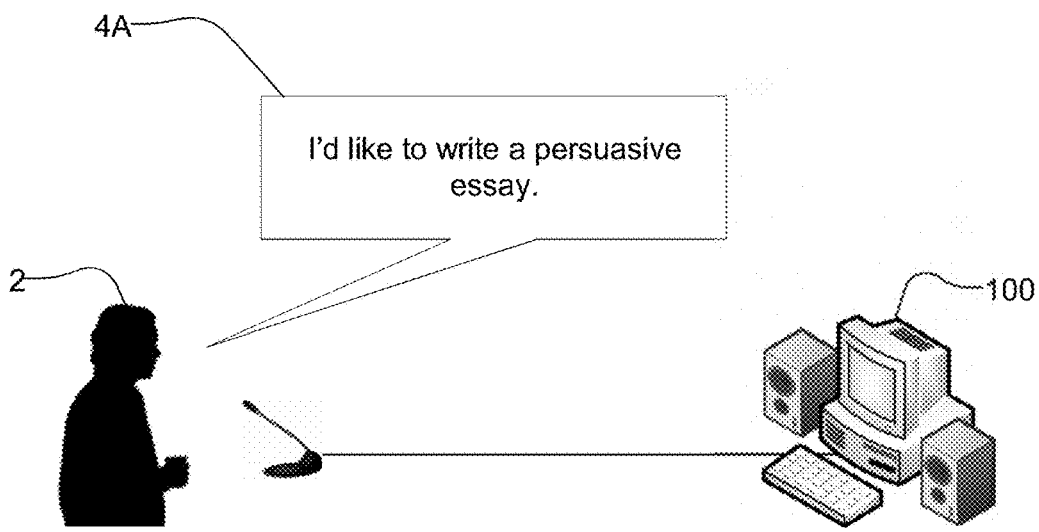
FIG. 2B illustrates the system receiving, from the user, a first voice input responding to the first question.
Figure 2C:
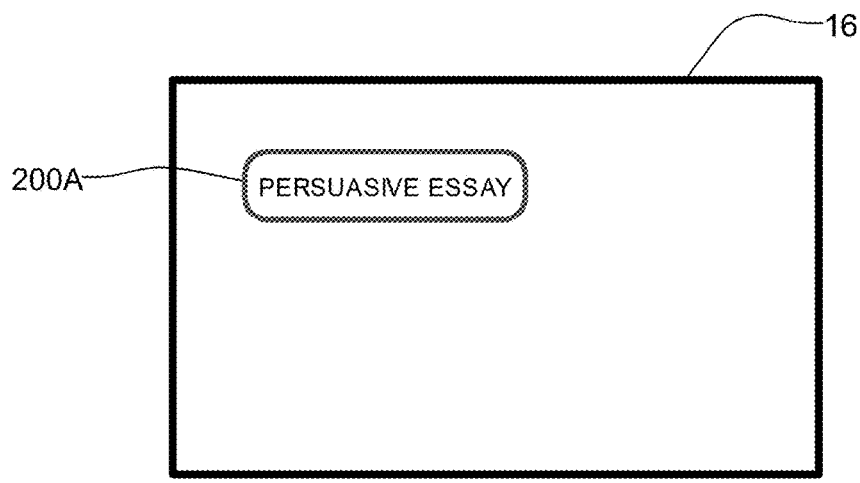
FIG. 2C illustrates the system displaying content of the first voice input received from the user.

In FIG. 2A, the system 100 may generate a first voice output 6A to ask the user 2 a first question regarding a type of a writing that the user 2 would like to write. For example, the system 100 may receive a user input from the user 2 indicating that he or she would like to initiate a turn-based writing assistant service. In turn, the system 100 may generate, via the speaker 12, a speech "So tell me about what you want to write about." In FIG. 2B, the system 100 may receive from the user 2, a first voice input 4A responding to the first question regarding a type of the writing. For example, the user 2 may say "I'd like to write a persuasive essay," which may be received by the system 100 as the first voice input 4A from the user 2. The system 100 may then process, using the voice module 24, to identify content of the first voice input 4A. Based on the identified content of the first voice input 4A, the system 100 may determine, using, for example, the local application 20, application service 40 or AI engine 70A, that the term "essay" is the most relevant to the first question regarding a type of the writing. The system 100 may also determine that the term "persuasive" is also relevant to the type of the writing. Based on the terms "essay" and "persuasive," the system 100 may determine that the user 2 wants to write a persuasive essay. Optionally, as shown in FIG. 2C, the system 100 may provide, via the display 16, a visual feedback 200A (e.g., thought bubble) that the system 100 has determined that the type of the writing is a "persuasive essay." While some people may find such live visualization helpful, others may find the visual feedback 200A distracting and unhelpful. Hence, such live visualization may be turned on or turn off by the user 2.

Figure 3A:
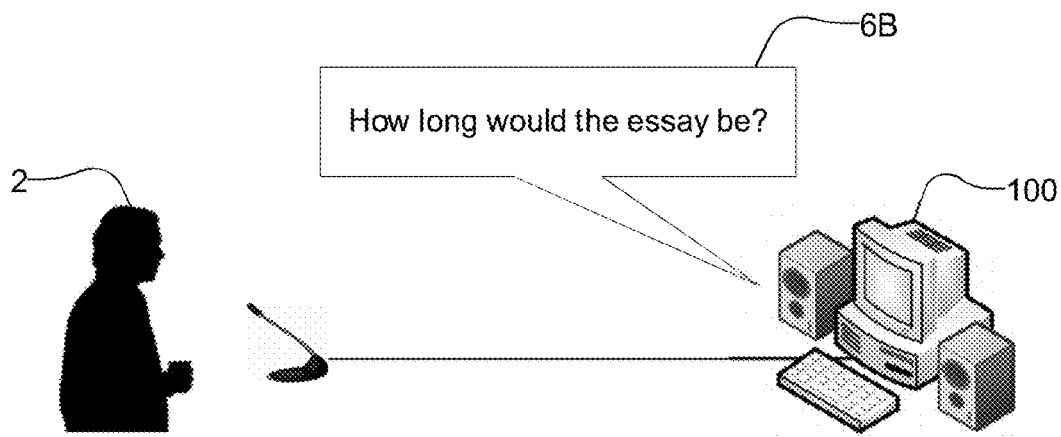
FIG. 3A illustrates the system generating, based on the content of the first voice input, a second voice output to ask the user a second question.
Figure 3B:
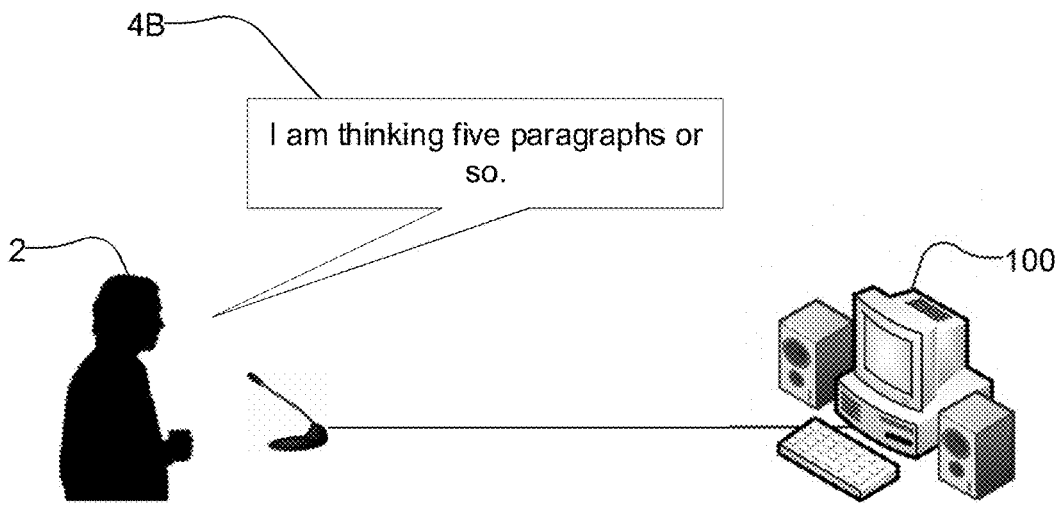
FIG. 3B illustrates the system receiving, from the user, a second voice input responding to the second question.
Figure 3C:
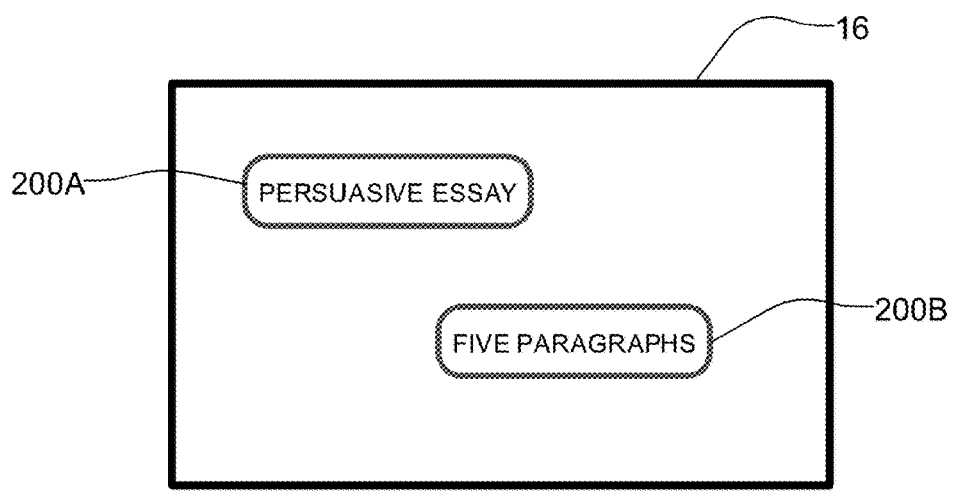
FIG. 3C illustrates the system displaying content of the second voice input received from the user.

In FIG. 3A, the system 100 may generate, based on the content of the first voice input, a second voice output 6B to ask the user 2 a second question regarding a length of the essay. For example, the system 100 may generate, via the speaker 12, a speech "How long would the essay be?" as the second voice output 6B. In FIG. 3B, the system 100 receiving, from the user 2, a second voice input 4B responding to the second voice output 6B. For example, the user 2 may say "I am thinking five paragraphs or so," which may be received by the system 100 as the second voice input 4B. The system 100 may then process the second voice input 4B to identify content of the second voice input 4B, and may determine, based on the content of the second voice input 4B, that a length of the essay should be approximately five paragraphs. Optionally, as shown in FIG. 3C, the system 100 may display, via the display 16, a visual feedback 200B that the system 100 has understood that the essay should be approximately five paragraph long.

Figure 4A:
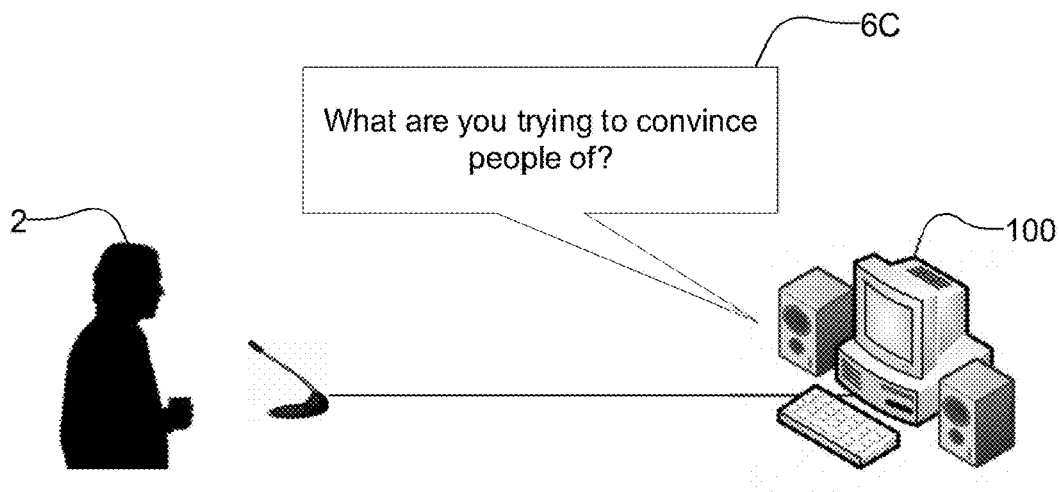
FIG. 4A illustrates the system generating, based on the content of the second voice input, a third voice output to ask the user a third question.

In FIG. 4A, the system 100 may generate, based on the content of the second voice input 4B, a third voice output 6C to ask the user 2 a third question regarding a subject or topic of the writing. For example, after determining that the user wants to write a five paragraph long persuasive essay from the first and second voice inputs 4A and 4B, the system 100 may determine that it is a time to ask the user 2 about content of the writing. Using the DL engine 70B, the system 100 may determine, based on process prior conversation sessions with the user 2 or other users, how to formulate and arranging questions regarding the selected writing type and length, which may be customized for the user 2. The system 100 may then decide to ask a question regarding the subject of the writing first. For example, the system 100 may generate, via the speaker 12, a speech "What are you trying to convince people of?" as the third voice output 6C. However, when the prior conversion session with the user 2 indicates that asking about the subject of the writing first did not result in an acceptable or optimal outcome, the system 100 may prepare a different question, such as, "Are there any particular issue that you would like to write about?" or "Tell me about what triggered you to write this essay," which may result in a different answer from the user 2, and the conversation session may be proceeded in a different direction with different questions being generated and asked in a different order.

Figure 4B:
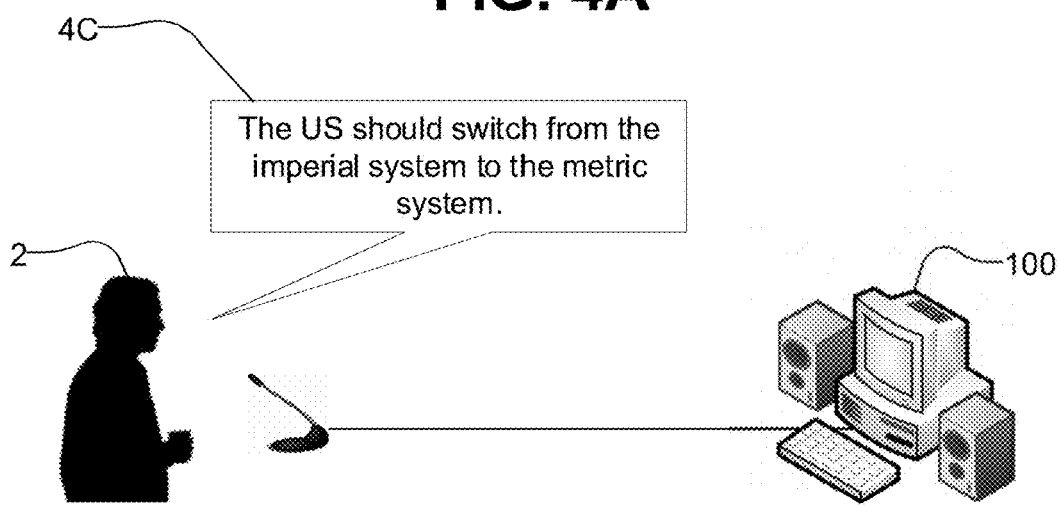
FIG. 4B illustrates the system receiving, from the user, a third voice input responding to the third question.
Figure 4C:
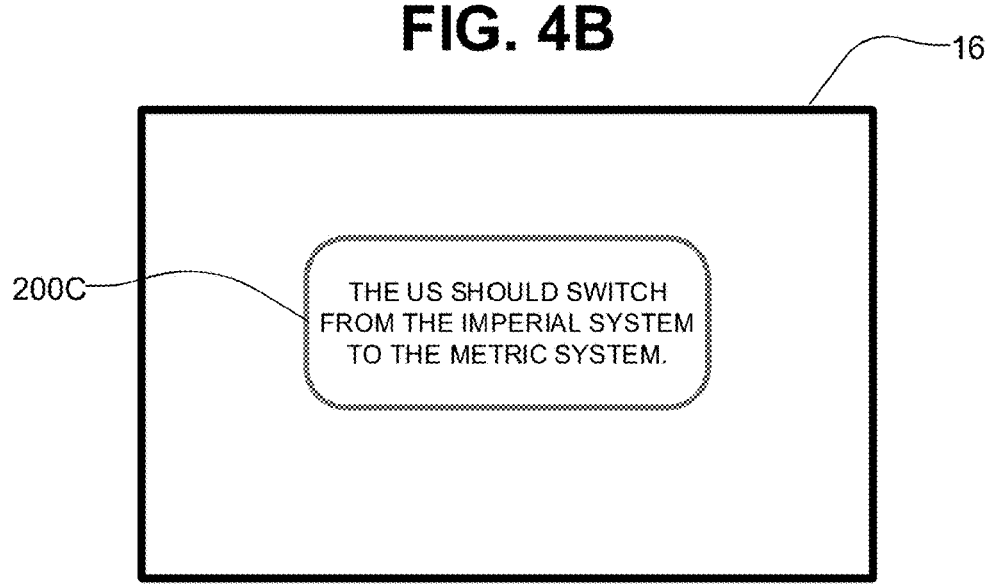
FIG. 4C illustrates the system displaying content of the third voice input received from the user.

In FIG. 4B the system 100 may receive, from the user 2, a third voice input 4C responding to the third voice output 6C. For example, the user 2 may say "The US should switch from the imperial system to the metric system," which may be received by the system 100 as the third voice input 4C. The system 100 may then process the third voice input 4C to identify content of the third voice input 4C and may determine that the subject of the essay is that The US should switch from the imperial system to the metric system, which may be optionally displayed as a third visual feedback 200C on the display 12, as shown in FIG. 3C.

Figure 5A:
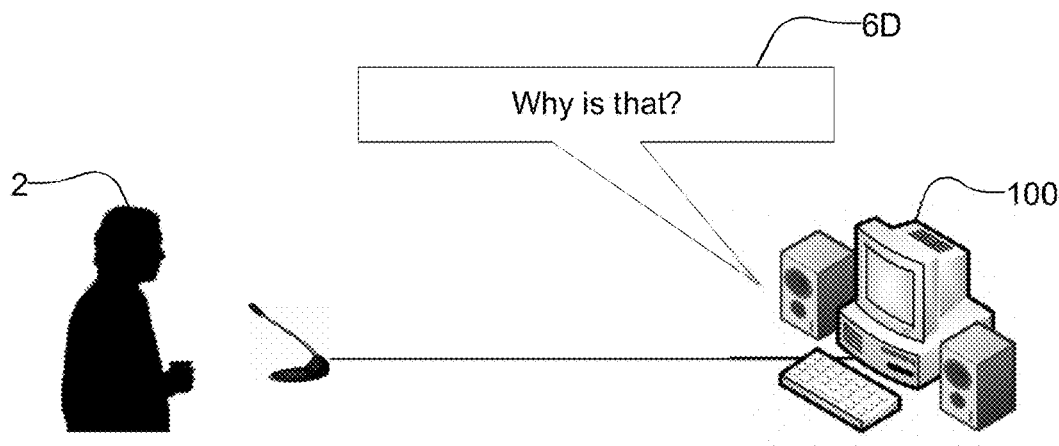
FIG. 5A illustrates the system generating, based on the content of the third voice input, a fourth voice output to ask the user a fourth question.
Figure 5B:
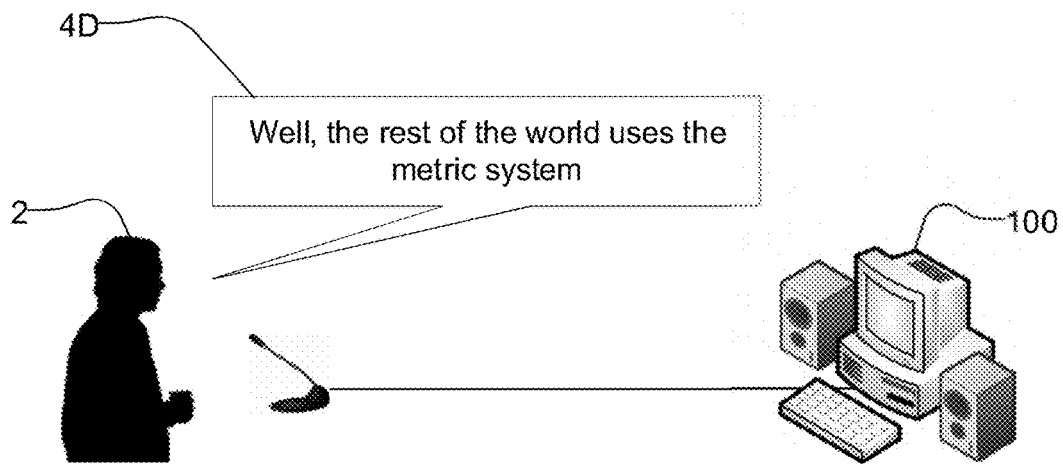
FIG. 5B illustrates the system receiving, from the user, a fourth voice input responding to the fourth question.
Figure 5C:
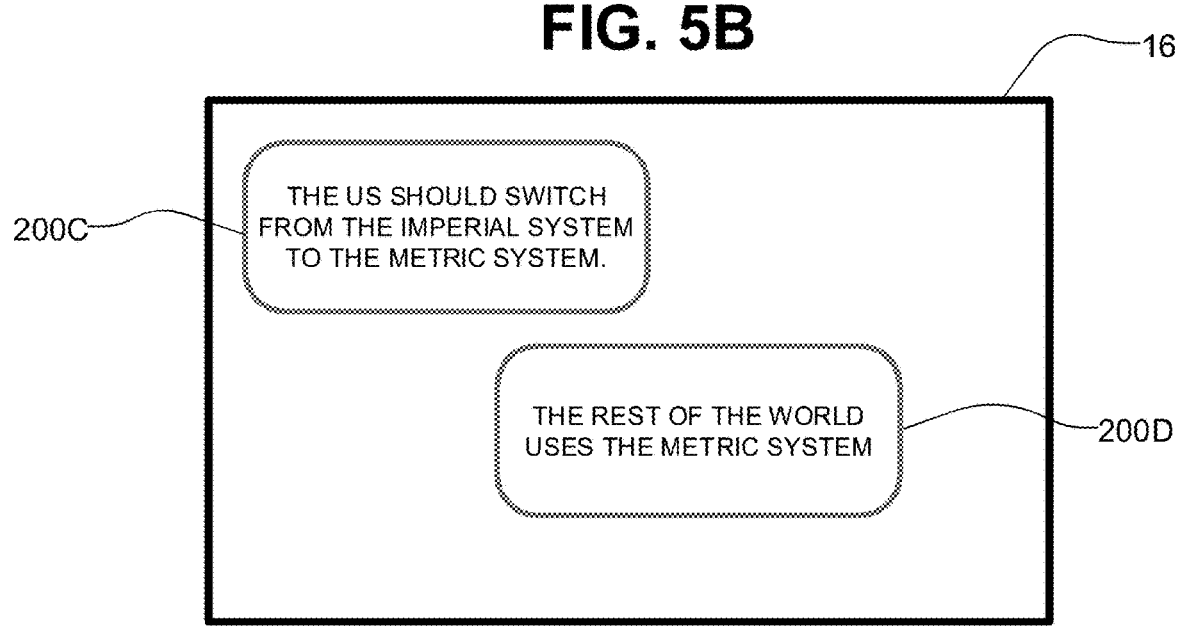
FIG. 5C illustrates the system displaying content of the fourth voice input received from the user.

In FIG. 5A, the system 100 may generate, based on the content of the third voice input 4C, a fourth voice output 6D to ask the user 2 a fourth question regarding a reason that the user 2 wants to write about the particular subject identified from the content of the voice input 4C. For example, the system 100 may generate a speech "Why is that?" as the fourth voice output 6D to ask the user 2 the reason why the US should switch from the imperial system to the metric system. In FIG. 5B, the user 2 may say "Well, the rest of the world uses the metric system," which may be received by the system 100 as a fourth voice input 4D from the user 2. The system 100 may then process the fourth voice input 4D to determine the content of the fourth voice input 4D, which may be displayed, via the display 116 as a fourth visual feedback 200D, as shown in FIG. 5D.

The system 100 may determine relevancy and accuracy of the fourth voice input 4D by, for example, using the AI engine 70A, DL engine 70B, etc. or searching the internet resources 50, data resources 60, structured content store 80, etc. For example, the system 100 may determine, using the AI engine 70A, that the fact that the rest of the world uses the metric system is relevant to the statement that the US should switch from the imperial system to the metric system. The system 100 may also conduct a search in the resources 50 and 60 to verify that the user's argument that the rest of the world uses the metric system is accurate. If the voice input 4D is determined to be irrelevant or inaccurate, the system 100 may generate another voice output indicating that the voice input 4D is not relevant or inaccurate.

Figure 6A:
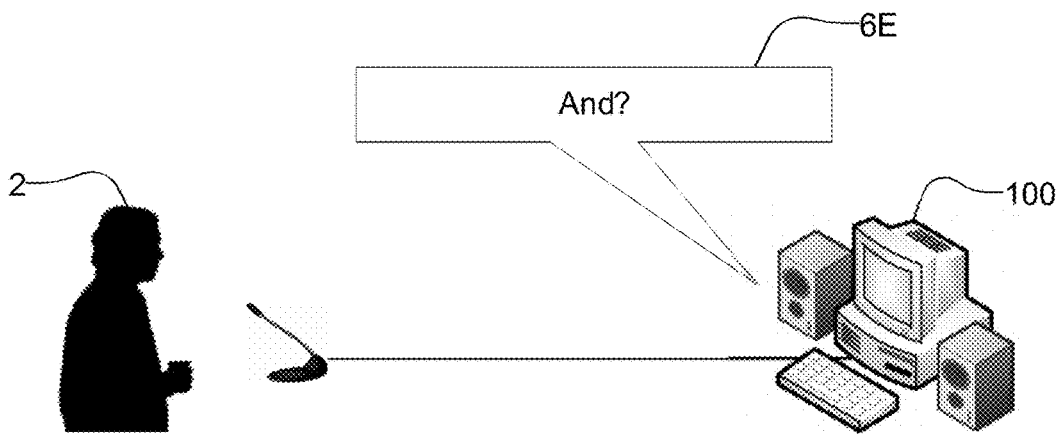
FIG. 6A illustrates the system generating, based on the content of the fourth voice input, a fifth voice output to ask the user a fifth question.
Figure 6B:
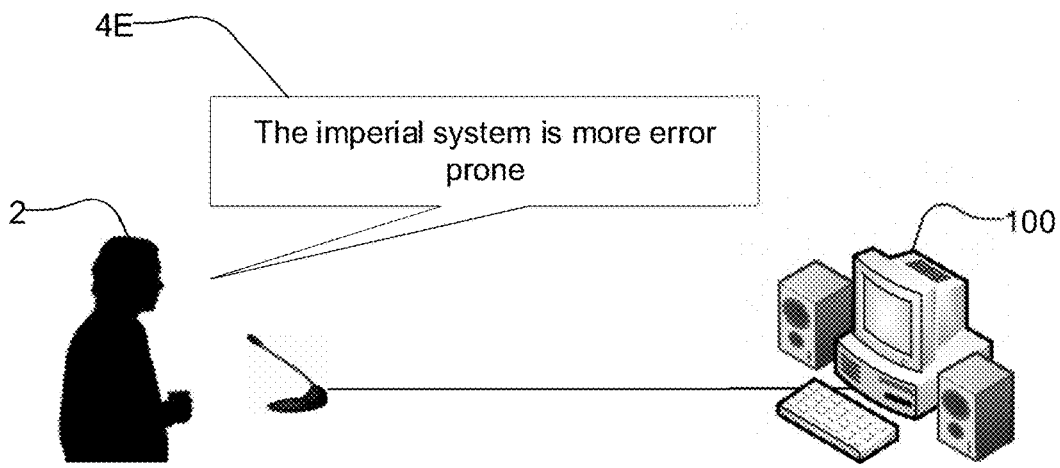
FIG. 6B illustrates the system receiving, from the user, a fifth voice input responding to the fifth question.
Figure 6C:
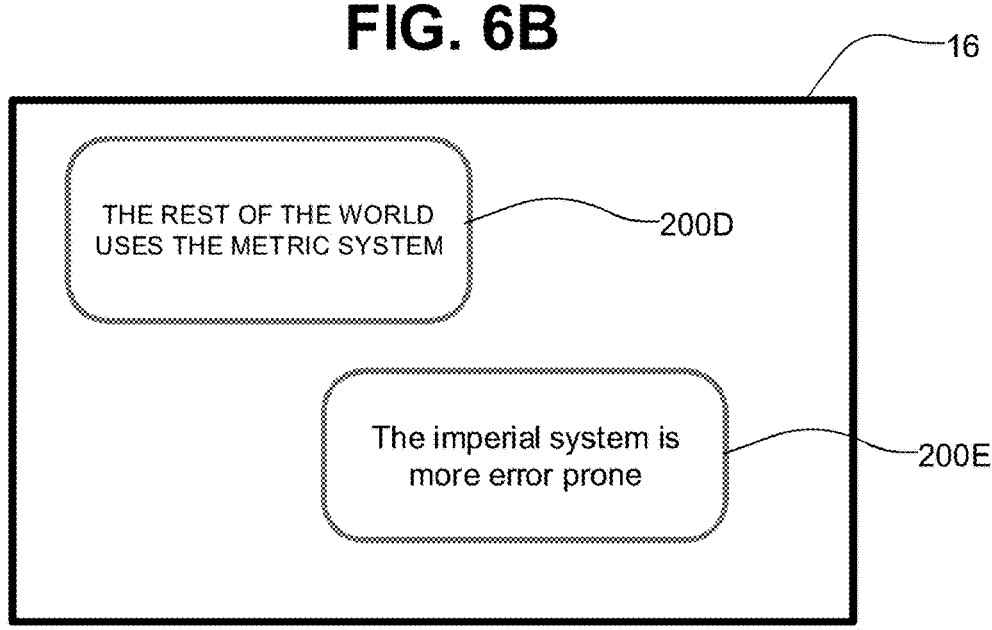
FIG. 6C illustrates the system displaying content of the fifth voice input received from the user.

The system 100 may determine that more reasons are needed to write a persuasive essay and to meet the five paragraph length requirement, and generate, via the speaker 12, a fifth voice output 6E to ask the user 2 if there are any other reasons. For example, as shown in FIG. 6A, the system 100 may generate a speech "And?" as the fifth voice output 6E. In FIG. 6B, the user 2 may say "The imperial system is more error prone," which may be received by the system 100 as a fifth voice input 4E from the user 2. By processing the fifth voice input 4E, the system 100 may identify content of the fifth voice input 4E, which may be optionally displayed, via the display 16, as fifth visual feedback 200E, as shown in FIG. 6C.

Figure 7A:
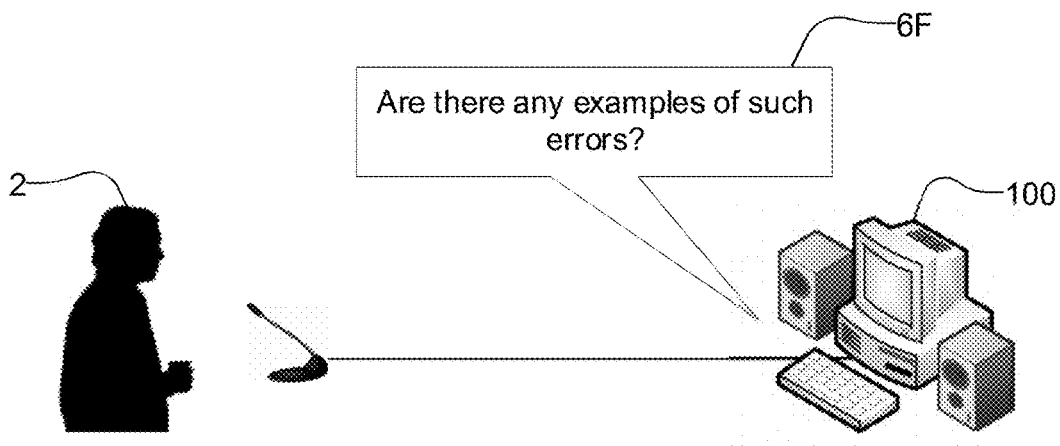
FIG. 7A illustrates the system generating, based on the content of the fifth voice input, a sixth voice output to ask the user a sixth question.
Figure 7B:
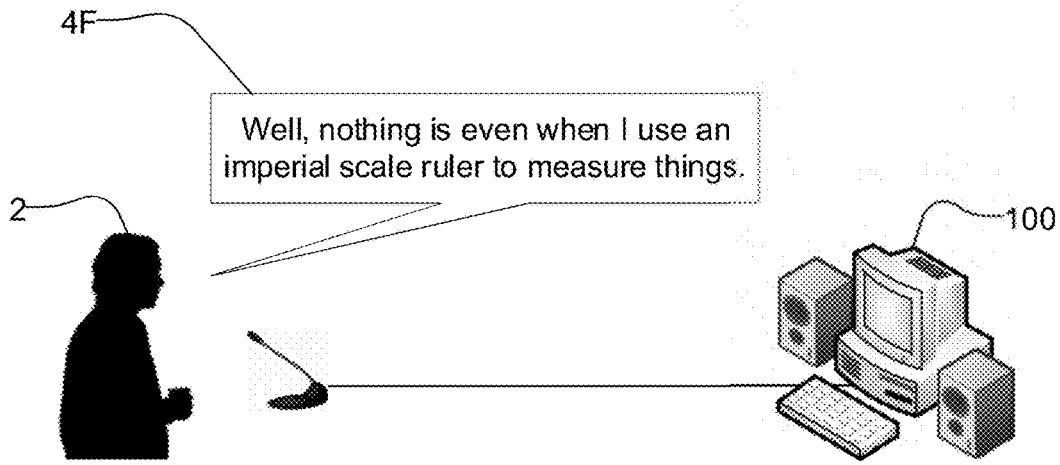
FIG. 7B illustrates the system receiving, from the user, a sixth voice input responding to the sixth question.
Figure 7C:
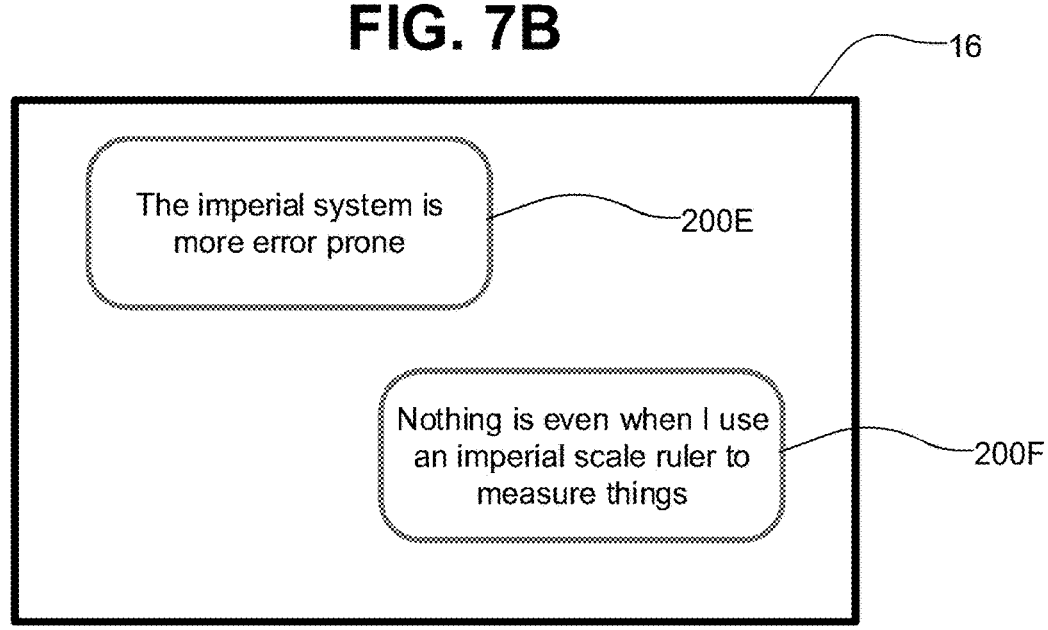
FIG. 7C illustrates the system displaying content of the sixth voice input received from the user.

In some cases, the system 100 may not be able to determine whether the content of a voice input is relevant or accurate. The system 100 may then generate, via the speaker 12, another voice output asking a question that may lead the user 2 to clarify as to the relevancy or accuracy of the voice input. For example, the system 100 may not able to determine that whether the content of the fifth voice input 4E that the imperial system is more error prone is accurate or not. Then, as shown in FIG. 7A, the system 100 may generate, via the speaker 12, a sixth voice output 6F, asking an example of such errors alleged by the user 2 in the fifth voice input 4E. For example, the system 100 may generate a speech "Are there any examples of such errors?" as the sixth voice output 6F. In FIG. 7B, the user 2 may say that "Well, nothing is even when I measure things with an imperial scale ruler," which may be received by the system 100 as a sixth voice input 4F. The content of the sixth voice input 4F may be displayed, on the display 16, as a sixth visual feedback 200F, as shown in FIG. 7C.

Figure 8A:
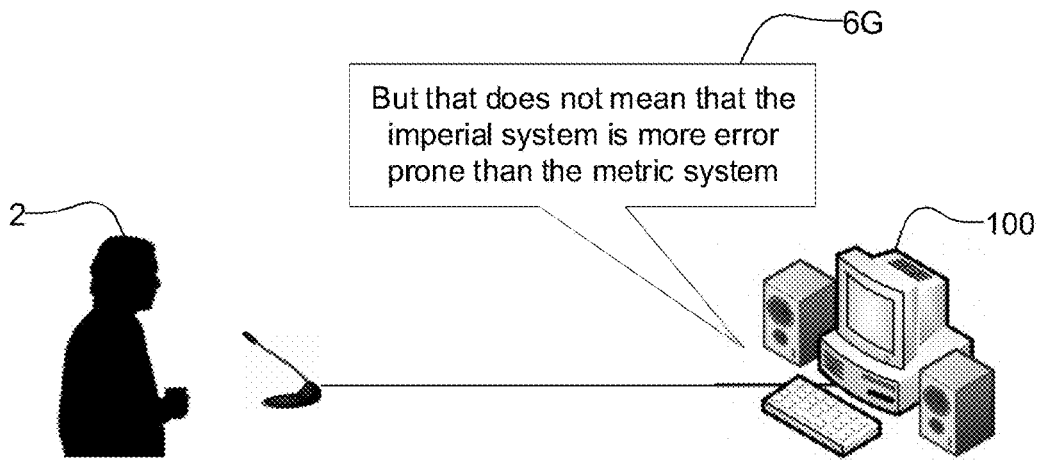
FIG. 8A illustrates the system generating, based on the content of the sixth voice input, a seventh voice output to ask the user a seventh question.
Figure 8B:
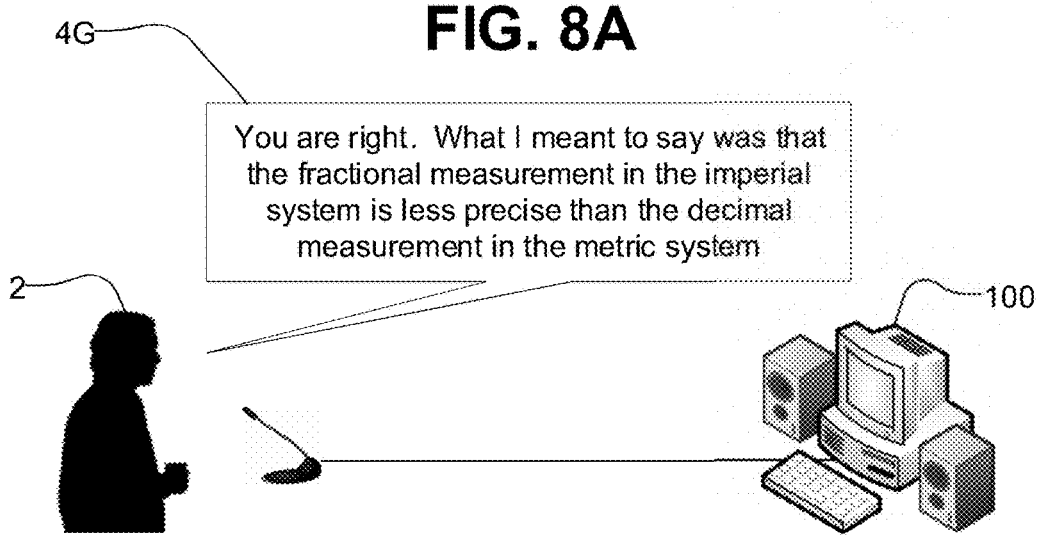
FIG. 8B illustrates the system receiving, from the user, a seventh voice input responding to the seventh question.
Figure 8C:
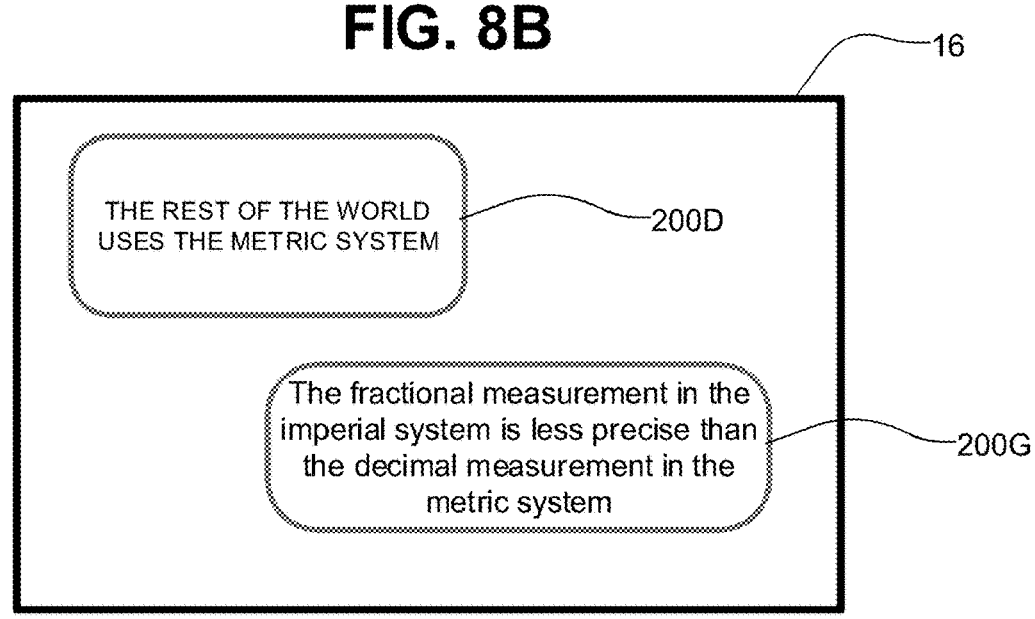
FIG. 8C illustrates the system displaying content of the seventh voice input received from the user.

The system 100 may process the sixth voice input 4F and identify content of the sixth voice input 4F. The system 100 may then determine, using, for example, the AI engine 70A, whether the sixth voice input 4F clarifies a relevancy or accuracy of the content of the fifth voice input 4E. If the sixth voice input 4F is determined to clarify that the fifth voice input 4E is not relevant or accurate, the system 100 generate, via the speaker 12, another voice output to indicate that the fifth voice input 4E is not relevant or accurate. For example, as shown in FIG. 8A, the system 100 may generate, via the speaker 12, a speech "But that does not mean that the imperial system is more error prone than the metric system" as a seventh voice output 6G to indicate that the sixth voice input 4F is not related to the fifth voice input 4F and the content of the fifth voice input 4F is not accurate. The seventh voice output 6G may make the user 2 realize the lack of accuracy and relevancy in the fifth and sixth voice inputs 4E and 4F. The user 2 may then say "You are right. What I meant to say was that the fractional measurement in the imperial system is less precise than the decimal measurement in the metric system," which may be received via the microphone 4 and captured as a seventh voice input 4G. As shown in FIG. 8C, the system 100 may then remove the visual feedback 200E from the display 14 and display the content of the seventh voice input 4G as a seventh visual feedback 200G.

Figure 9A:
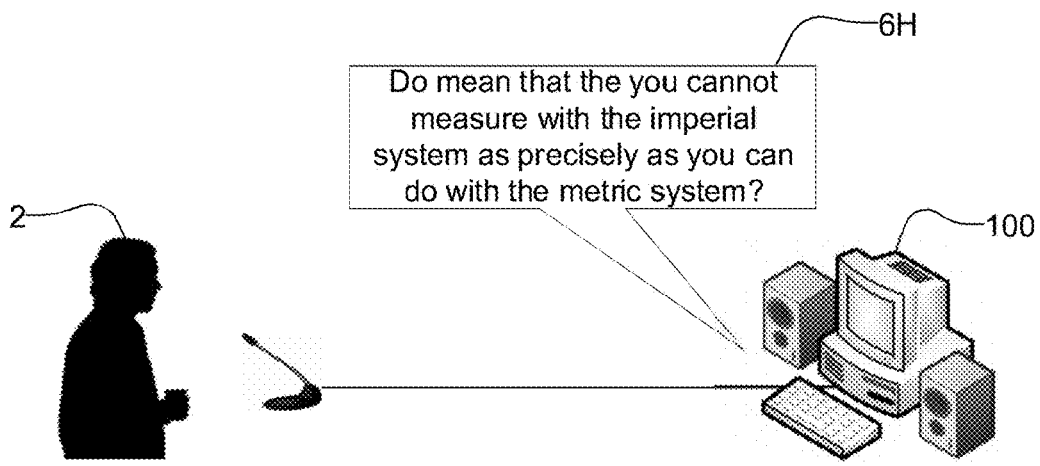
FIG. 9A illustrates the system generating, based on the content of the seventh voice input, an eighth voice output to ask the user an eighth question.
Figure 9B:
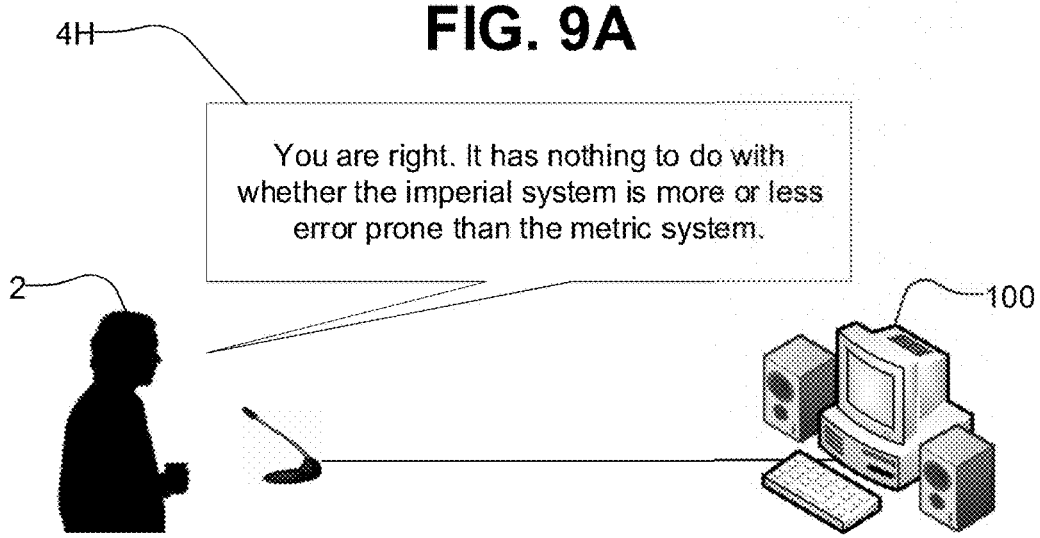
FIG. 9B illustrates the system receiving, from the user, an eighth voice input responding to the eighth question.
Figure 9C:
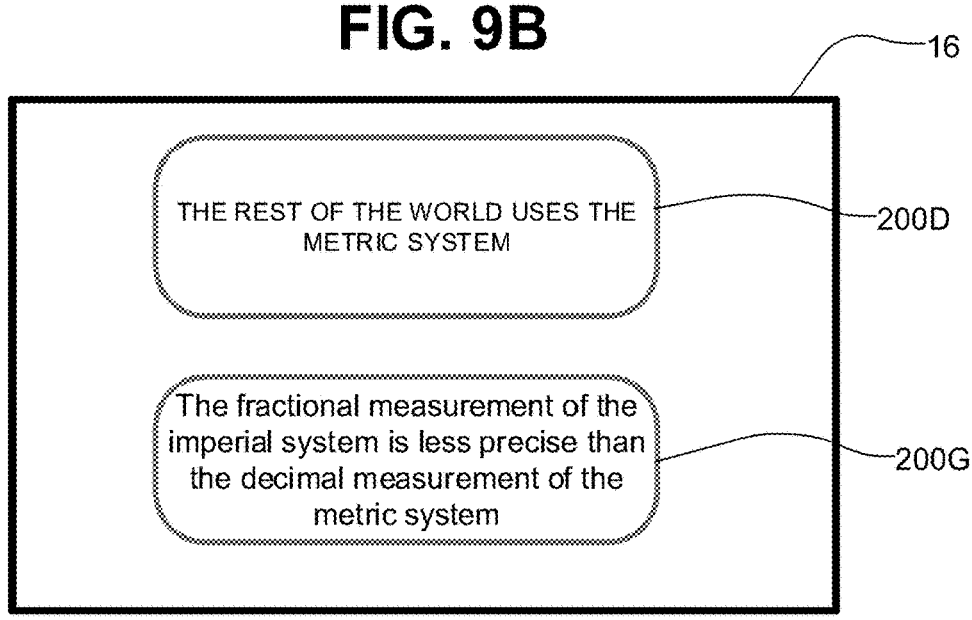
FIG. 9C illustrates the system displaying content of the eighth voice input received from the user.

In FIG. 9A, based on the content of the seventh voice input 4G, the system 100 may generate, via the speaker 12, an eighth voice output 6H to confirm that the system 100 has correctly determined the content of the seventh voice input 4G. For example, the system 100 may generate, via the speaker 12, a speech "Do mean that the you cannot measure things with the imperial system as precisely as you can do with the metric system?" which may be output via the speaker 14 as the eighth voice output 6H. In FIG. 9B, the user 2 may then say "You are right. It has nothing to do with whether the imperial system is more or less error prone than the metric system" which may be received by the system 100 as an eighth voice input 4H from the user 2. Based on the received eighth voice input 4H, the system 100 may determine that the system 100 has correctly determined the content of the seventh voice input 4G. Optionally, as shown in FIG. 9C the system 100 may also display the content of the fourth and seventh voice inputs 4D and 4G as the visual feedbacks 200D and 200G to indicate the user 2 that so far the content of the fourth and seventh voice inputs 4D and 4G have been selected as the reasons associated with the subject of the writing.

Figure 10A:
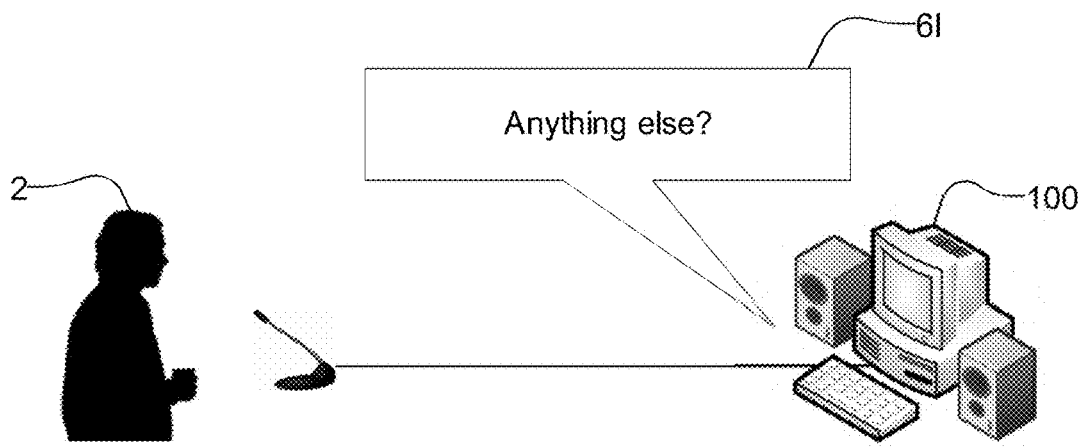
FIG. 10A illustrates the system generating, based on the content of the eighth voice input, a ninth voice output to ask the user a ninth question.
Figure 10B:
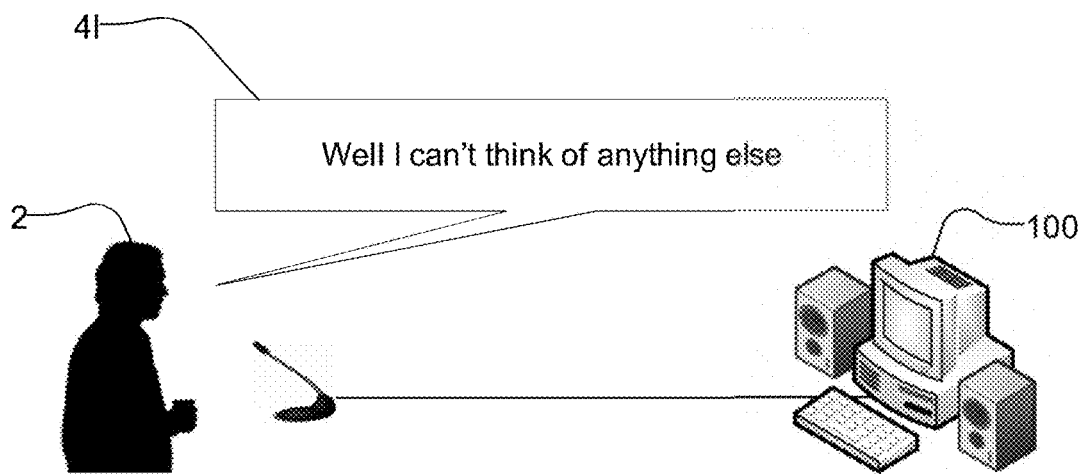
FIG. 10B illustrates the system receiving, from the user, a ninth voice input responding to the ninth question.
Figure 10C:
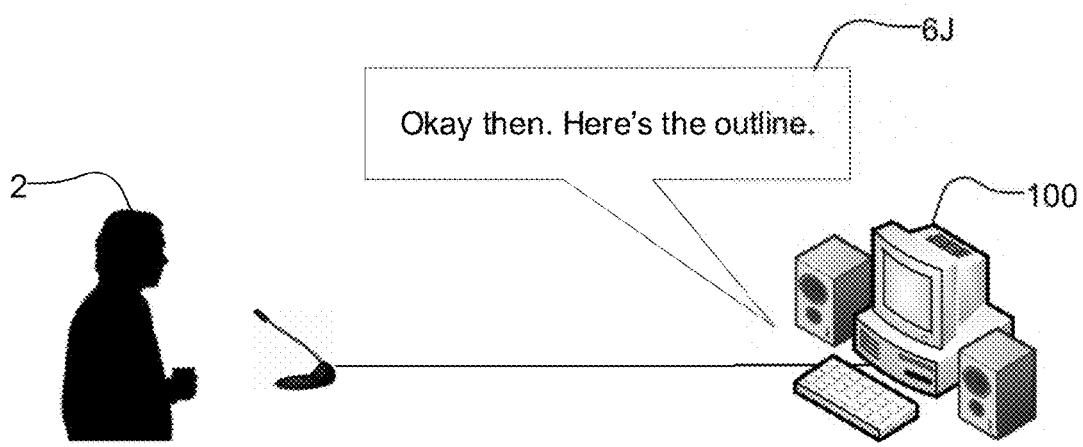
FIG. 10C illustrates the system generating a tenth voice output when a predetermined condition is met.

The system 100 may keep generating another voice output in response to the preceding voice input from the user 2 until a predetermined condition is met. For example, the system 100 may continue to generate a new question until information collected from the voice inputs from the users has reached a sufficient amount to meet the length of the writing determined from the second voice input 4B (shown in FIG. 3B). Alternatively, the predetermined condition may be met when the user 2 may not have anything more to say about the writing. For example, as shown in FIG. 10A, the system 100 may generate, via the speaker 12, a ninth voice output 6I to ask if there is anything else that the user 2 wants to say in connection with the subject of the writing. In FIG. 10G, the user 2 may say "Well I can't think of anything else," which may be received by the system 100 as a ninth voice input. The system 100 may then process the ninth voice input and identify that the user 2 has nothing more to say and determined that the predetermined condition is met and it is no longer necessary to generate another question in connection with the writing. The system 100 may then generate, via the speaker 12, a tenth voice output to indicate that the conversion session is completed and an outline or summary for the writing will be generated, as shown in FIG. 10C.

Figure 11:
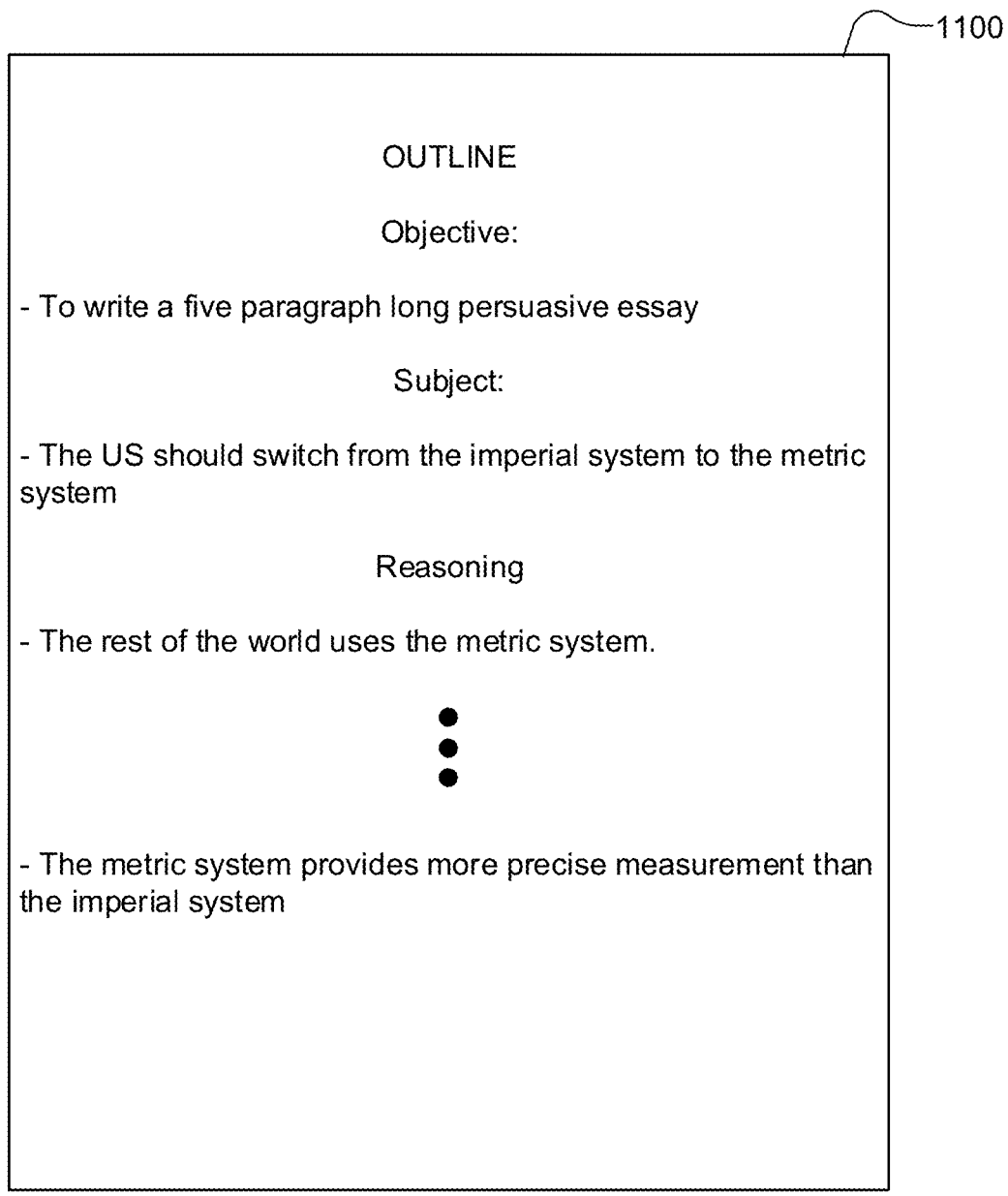
FIG. 11 illustrates an implementation of an outline for the writing generated based on the content of the first to ninth voice input received from the user.

Upon completing the conversion with the user 2, the system 100 may then generate, based on the content of the received voice inputs, an outline or summary of the writing. An example of such outline or summary is shown as a document 1100 in FIG. 11. The document 1100 may be produced in any format. For example, the document 110 may be printed out on a piece of paper or displayed on a computer as an online document. In the document 1100, the content of the voice inputs from the user may be arranged in a predetermined manner such that the user 2 can easily understand. For example, the content may be divided into Objectives, Subject and Reasoning parts. The objective part may indicate the type of writing (e.g., persuasive essay) and the length of the writing (e.g., five paragraphs). The Subject part may indicate the topic that the user 2 wants to write about (e.g., The US should switch from the imperial system to the metric system). The Reasoning part may include the reasons why the user 2 feels that the US should switch from the imperial system to the metric system, such as the rest of the world uses the metric system, the metric system provides more precise measurement than the imperial system, etc. As such, by talking to the system 100, the user 2 may be provided with a brief and concise outline for the writing, which the user 2 was not able to easily come up with.

FIG. 12 illustrates a flow diagram of a method 1200 of operating the system 100 for providing a writing assistant service. With reference to the system 100 shown in FIG. 1, at step 1210, the system 100 may receiving, from the user 2, a user input to initiate a conversation session for generating an outline for a writing. For example, the user 2 may, using a user interface (e.g., a keyboard, mouse, touchscreen, etc.), activate the local application 20, which may be a standalone software program, a software module for another application, a mobile app, etc.

At step 1220, the system 100 may generate, via the speaker 112, a voice output asking a question regarding the writing that the user 2 wants to write. For example, the system 100 may generate a voice "So tell me about what you want to write about." as shown in FIG. 2A.

At step 1230, the system 100 may receive, via the microphone 14, a voice input from the user responding to the voice output generated in step 1220. For example, as shown in FIG. 2B, the user 2 may say "I'd like to write a persuasive essay," which may be received as a voice input from the user 2.

At step 1240, the system 100 may then identify, based on the received voice input, content of the voice input responding to the voice output. For example, the system 100 may process the received voice input "I'd like to write a persuasive essay," and identify that the user 2 wants to write a persuasive essay. The system 100 may also determine whether the convent of the voice input is relevant to the voice output or accurate. For example, as shown in FIG. 1, the system 100 may determine, using the AI engine 70A or DL engine 79B, whether the voice input from the user 2 is relevant to the question asked in the voice output. When the system 100 asked a type of writing and the user 2 answered that "I want to write about why the US should switch to the metric system," the system 100 may find such answer to be not relevant to the question. The system 100 may then generate another voice output indicating that the user's voice input is not relevant to the question. When the system 100 asked a type of writing and the user 2 answered that "The imperial system is more error prone," the system 100 may determine that such answer by the user 2 is irrelevant to the question. The system 100 may also conduct searches on the internet resources 50, data resources 60, structured content store 80, etc. to verify whether the such statement by the user 2 is factually correct. If the search result indicates that the user's statement is incorrect, the system 100 may generate a voice output pointing out incorrectness of the user's statement. As such, in addition to collecting information from the user 2, the system 100 may also check whether the user 2 is providing relevant and correct information, which are crucial in most situations involving writing. Hence, the system 100 may guide the user 2 to a right direction for producing effective writing.

At step 1250, the system 100 may determine whether a predetermined condition is met and no more question needs to be generated. For example, the system 100 may determine an amount of information that needs to be collected from the user 2 for the writing. The amount of information needed may be determined based on the length of the writing. Alternatively or additionally, the predetermined condition may be met when the user 2 indicates that he or she does not have any more input in connection with the writing. Once the predetermined condition is met (YES at step 1250), the system 100 may generate, at step 1260, an outline for the writing based on the content of the voice inputs from the user 2.

When the predetermined condition is not met (NO at step 1250), the process 1200 may loop back to step 1220, and the system 100 may generate another voice output asking a new question regarding the writing. The system 100 may generate a new question based on the voice input from the user 2 responding to the question asked in the precedent voice output. For example, when the user 2 answered that he or she would like to write a persuasive essay, the system 100 may then generated, based on the answer form the user 2 that he or she would like to write a persuasive essay, a new question asking how long the user 2 wants the essay to be. In another example, when the user 2 answered that he or she wants to write about the topic that the US should switch from the imperial system to the metric system as shown in FIG. 4B, the system may generate a new question asking the reason why the user 2 believes so, as shown in FIG. 5A. The system 100 may keep generating a voice output 6 asking a new question regarding the writing (at step 1220), receiving a voice input 4 from the user 2 responding to the voice output (at step 1230) and identifying, based on the received voice input 4, content of the voice input 4 responding to the voice output 6, etc. until the predetermined condition is met (YES at step 1250). The system 100 may then generate, based on the received voice inputs, the outline for the writing (at step 1260).

The turn-based conversion between the system 100 and user 2 may not be a strictly turn-by-turn conversation. Depending on a situation, the system 100 may adjust a frequency of the voice output 6. For example, the user 2 may provide a plurality of reasons for why he or she believes that the US should switch to the metric system. In such case, the system 100 may pay more attention to listening to the voice inputs 4 from the user 2 and generate the voice output 6 less frequently. Also, the frequency of the voice outputs 6 may be dynamically adjusted. For example, the system 100 may be used to generate a storyline for a novel or movie script. In such case, the user 2 may continue to provide the voice inputs 4 regarding characters, relationship, events, timelines, etc. and the system 100 may keep listening to and processing the voice inputs 4 and identifying contents without generating a voice output 6. When the system 100 determines that there is a conflict between two or more voice inputs 4, the system 100 may generate a voice output 6 notifying such conflict. The system 100 may then receive, from the user 2, another voice input correcting the conflict, and modify the contents collected from the voice inputs 6 to resolve the conflict in the storyline. Hence, the system 100 may be operated to provide a voice output only when it is necessary or required by the user 2. As such, the system 100 may be operated in a flexible manner. For example, during a conversation session, the system 100 may switch from a turn-by-turn conversation mode to a listening mode when the user 2 provides a series of ideas and thoughts. The system 100 may then continue to process the received ideas and generate a visual representations of the ideas (e.g., the visual feedbacks or thought bubbles 200) on the display 16. The system 100 may allow the user 2 to interact with the displayed visual representation, using, for example, a touch pad, stylus, keyboard, mouse, etc. such that the user 2 can rearrange, move, edit or delete the visual representations on the display 16. For example, during a brainstorming session, the system 100 may listen to the participants and generate visual feedbacks (e.g., thought bubbles) on the display 16 such that the participants can see and understand what they have discussed. The display 16 may include a touch screen, and the participants may rearrange the thought bubbles by touching and dragging the thought bubbles to another location on the touch screen. As such, the system 100 may provide a number of operation modes and allow the users to switch from one operational mode to another.

Figure 13:
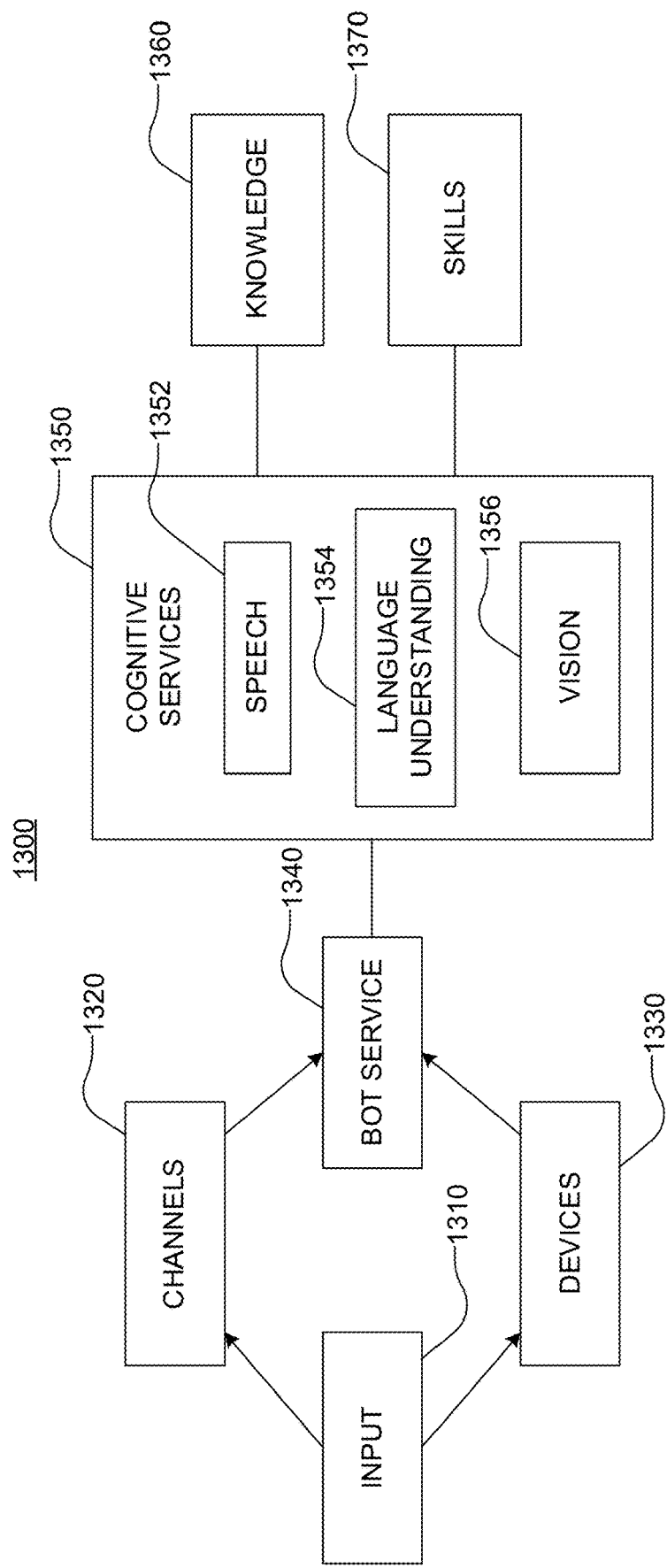
FIG. 13 illustrates another implementation of a system for providing a writing assistant service.

FIG. 13 illustrates an implementation of a system 1300 for providing a writing assistant service. The system 1300 may be a bot framework, which may allow a user to build an intelligent bot that has abilities to speak, listen, understand and learn from the user 2 to provide conversational AI experience necessary for the writing assistant service. The bot framework may include a bot service 1340 and cognitive services 1350, which may be implemented as the application service 40 operating in the application server 30. Alternatively, the bot service 1340 and cognitive services 1350 may be implemented across the local application 20 in the local device 10 and the application service 40 operating in the application server 30.

The bot service 1340 may allow a user to build a writing assistant bot by taking a simple Q&A session or interacting with a virtual bot-building assistant. The bot may be connected to one or more channels 1320 (e.g., an email platform, messenger platform, conferencing platform, virtual assistant platform, search platform, etc.) or one or more devices 1330 (e.g., a mobile phone, computer, home automation device, home appliance, security device, HVAC device, vehicle, etc.). The channels 1320 and device 1330 may include or be connected to a user interface (e.g., a microphone, speaker, keyboard, mouse, touchpad, etc.) to receive a user input 1310 (e.g., a voice input, typing, mouse click, touchpad tapping, etc.).

The bot service 1340 may connect the user to the cognitive services 1350, which may include a speech service 1352, language understanding service 1354, vision service 1356, etc. The cognitive services 1350 may operate in connection with external resources, such as, a knowledge resource 1360 (e.g., general knowledge, data sources, manuals, etc.), skills resource 1370 (e.g., mail, point of interest, automotive, custom, tasks, calendar, etc.), etc. Using the speech and language understanding services 1352 and 1354, the bot may allow the channels 1320 and device 1330 to carry out a conversation session with the user. The cognitive service 1350 may then process the voice inputs 1310, received from the user via the channel 1320 or device 1330, to identify the context of the voice inputs, and formulate questions based on the context of the voice inputs. The cognitive services 1350 may also refer to the knowledge and skills resource 1360 and 1370 to determine a relevancy and accuracy of the context of the voice inputs to manage the conversation session in an efficient and productive manner.

Figure 14:
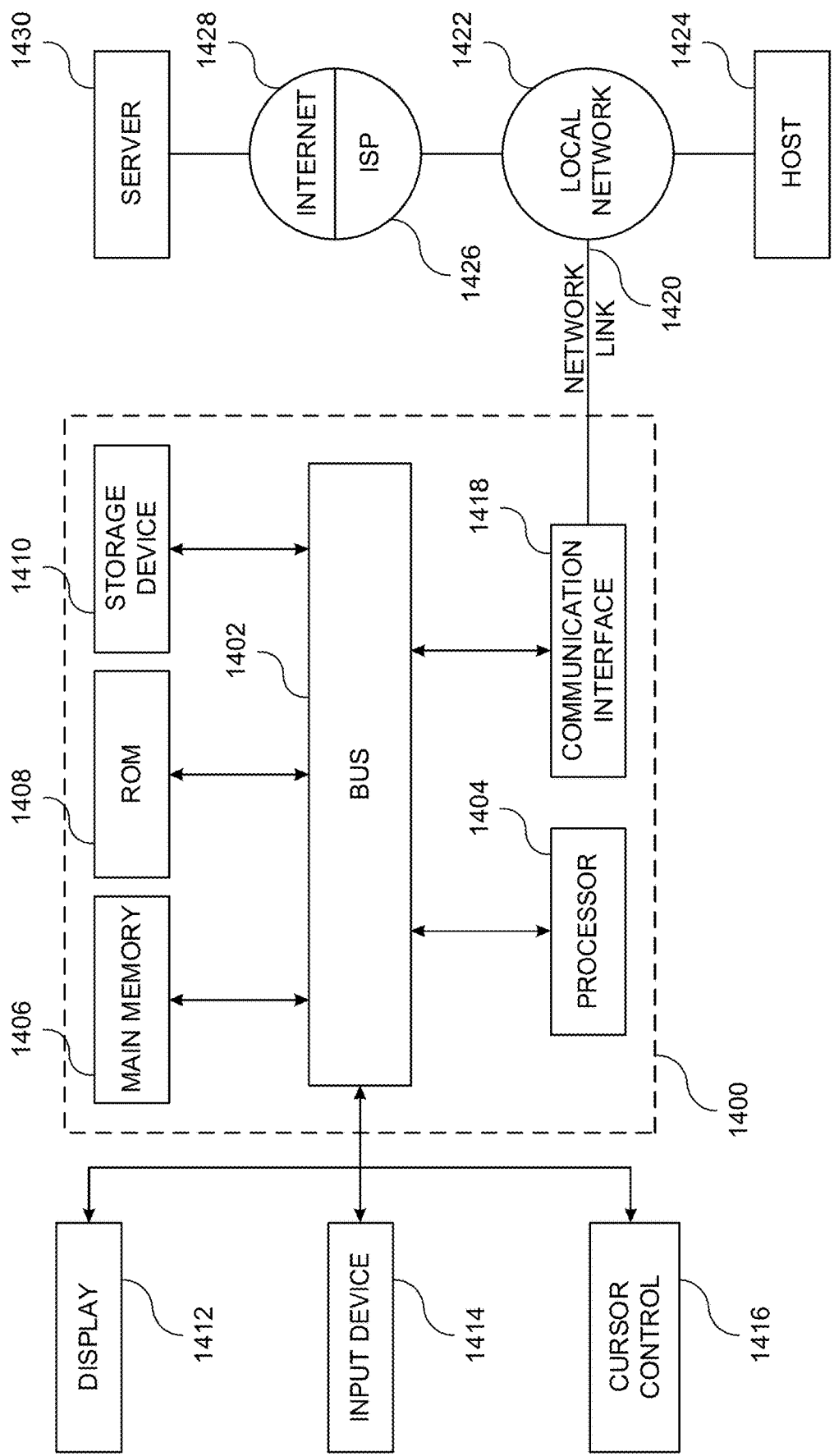
FIG. 14 is a block diagram showing an example computer system upon which aspects of this disclosure may be implemented.

FIG. 14 is a block diagram showing an example a computer system 1400 upon which aspects of this disclosure may be implemented. The computer system 1400 may include a bus 1402 or other communication mechanism for communicating information, and a processor 1404 coupled with the bus 1402 for processing information. The computer system 1400 may also include a main memory 1406, such as a random-access memory (RAM) or other dynamic storage device, coupled to the bus 1402 for storing information and instructions to be executed by the processor 1404. The main memory 1406 may also be used for storing temporary variables or other intermediate information during execution of instructions to be executed by the processor 1404. The computer system 1400 may implement, for example, the local device 10 and application server 30.

The computer system 1400 may further include a read only memory (ROM) 1408 or other static storage device coupled to the bus 1402 for storing static information and instructions for the processor 1404. A storage device 1410, such as a flash or other non-volatile memory may be coupled to the bus 1402 for storing information and instructions.

The computer system 1400 may be coupled via the bus 1402 to a display 1412, such as a liquid crystal display (LCD), for displaying information. One or more user input devices, such as the example user input device 1414 may be coupled to the bus 1402, and may be configured for receiving various user inputs, such as user command selections and communicating these to the processor 1404, or to the main memory 1406. The user input device 1414 may include physical structure, or virtual implementation, or both, providing user input modes or options, for controlling, for example, a cursor, visible to a user through display 1412 or through other techniques, and such modes or operations may include, for example virtual mouse, trackball, or cursor direction keys.

The computer system 1400 may include respective resources of the processor 1404 executing, in an overlapping or interleaved manner, respective program instructions. Instructions may be read into the main memory 1406 from another machine-readable medium, such as the storage device 1410. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 1410. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 1400 may also include a communication interface 1418 coupled to the bus 1402, for two-way data communication coupling to a network link 1420 connected to a local network 1422. The network link 1420 may provide data communication through one or more networks to other data devices. For example, the network link 1420 may provide a connection through the local network 1422 to a host computer 1424 or to data equipment operated by an Internet Service Provider (ISP) 1426 to access through the Internet 1428 a server 1430, for example, to obtain code for an application program.

In the following, further features, characteristics and advantages of the invention will be described by means of items:

Item 1. A device comprising a processor and a memory in communication with the processor, the memory comprising executable instructions that, when executed by the processor, cause the processor to control the device to perform functions of receiving a user input to initiate a conversation session for generating an outline for a writing; generating a voice output asking a question regarding the writing; receiving a voice input from the user responding to the voice output; identifying, based on the received voice input, content of the voice input responding to the voice output; repeating, until a predetermined condition is met, the steps of generating the voice output, receiving the voice input, and identifying the content of the voice input, wherein the question asked via each voice output is generated in response to the content of the voice input responding to the preceding voice output; and generating, based on the content of the voice inputs, the outline for the writing.

Item 2. The device of Item 1, wherein the instructions, when executed by the processor, further cause the processor to control the device to perform a function of determining, based on the identified content, a relevancy of the voice input to the question in the preceding voice output.

Item 3. The device of Item 2, wherein the instructions, when executed by the processor, further cause the processor to control the device to perform functions of determining, based on the identified content, that the voice input is not relevant to the question in the preceding voice output; and generating another voice output indicating that the voice input is not relevant to the preceding voice output.

Item 4. The device of Item 1, wherein the instructions, when executed by the processor, further cause the processor to control the device to perform a function of determining, based on the identified content, an accuracy of the voice input.

Item 5. The device of Item 4, wherein the instructions, when executed by the processor, further cause the processor to control the device to perform functions of determining, based on the identified content, that the voice input is not accurate; and generating another voice output indicating that the voice input is not accurate.

Item 6. The device of Item 1, wherein, for generating the voice output, the instructions, when executed by the processor, further cause the processor to control the device to perform a function of generating a first voice output asking a first question regarding a type of the writing, and for identifying content of the voice input, the instructions, when executed by the processor, further cause the processor to control the device to perform a function of determining, based on the received voice input, determining the type of the writing.

Item 7. The device of Item 6, wherein, for repeating generating the voice output, the instructions, when executed by the processor, further cause the processor to control the device to perform a function of generating, in response to the type of writing determined based on the received voice input, a second voice output asking a second question regarding a length of the writing.

Item 8. The device of Item 7, wherein the instructions, when executed by the processor, further cause the processor to control the device to perform functions of receiving, in response to the second voice output, another voice input related to the length of the writing; determining, based on the received voice input, the predetermined condition comprising an amount of information to be collected from the user; and determining, based on the determined amount of information, whether the repeated steps of generating the voice output, receiving the voice input, and identifying the content of the voice input have met the predetermined condition.

Item 9. The device of Item 1, wherein for generating the voice output, the instructions, when executed by the processor, further cause the processor to control the device to perform a function of generating a first voice output asking a first question related to a subject of the writing, a reason for selecting the subject of the writing, or an example of the reason.

Item 10. A non-transitory computer readable medium containing instructions which, when executed by a processor, cause a computer to perform functions of receiving a user input to initiate a conversation session for generating an outline for a writing; generating a voice output asking a question regarding the writing; receiving a voice input from the user responding to the voice output; identifying, based on the received voice input, content of the voice input responding to the voice output; repeating, until a predetermined condition is met, the steps of generating the voice output, receiving the voice input, and identifying the content of the voice input, wherein the question asked via each voice output is generated in response to the content of the voice input responding to the preceding voice output; and generating, based on the content of the voice inputs, the outline for the writing.

Item 11. A method of operating a device for providing a writing assistant service, comprising receiving a user input to initiate a conversation session for generating an outline for a writing; generating a voice output asking a question regarding the writing; receiving a voice input from the user responding to the voice output; identifying, based on the received voice input, content of the voice input responding to the voice output; repeating, until a predetermined condition is met, the steps of generating the voice output, receiving the voice input, and identifying the content of the voice input, wherein the question asked via each voice output is generated in response to the content of the voice input responding to the preceding voice output; and generating, based on the content of the voice inputs, the outline for the writing.

Item 12. The method of Item 11, further comprising determining, based on the identified content, a relevancy of the voice input to the question in the preceding voice output.

Item 13. The method of Item 12, further comprising determining, based on the identified content, that the voice input is not relevant to the question in the preceding voice output; and generating another voice output indicating that the voice input is not relevant to the preceding voice output.

Item 14. The method of Item 11, further comprising determining, based on the identified content, an accuracy of the voice input.

Item 15. The method of Item 14, further comprising determining, based on the identified content, that the voice input is not accurate; and generating another voice output indicating that the voice input is not accurate.

Item 16. The method of Item 11, wherein generating the voice output comprises generating a first voice output asking a first question regarding a type of the writing, and identifying content of the voice input comprises determining, based on the received voice input, determining the type of the writing.

Item 17. The device of Item 16, wherein repeating generating the voice output comprises generating, in response to the type of writing determined based on the received voice input, a second voice output asking a second question regarding a length of the writing.

Item 18. The device of Item 17, further comprising receiving, in response to the second voice output, another voice input related to the length of the writing; determining, based on the received voice input, the predetermined condition comprising an amount of information to be collected from the user; and determining, based on the determined amount of information, whether the repeated steps of generating the voice output, receiving the voice input, and identifying the content of the voice input have met the predetermined condition.

Item 19. The method of Item 11, wherein generating the voice output comprises generating a first voice output asking a first question related to a subject of the writing, a reason for selecting the subject of the writing, or an example of the reason.

Item 20. The method of Item 11, further comprising displaying, on display, the content of the voice input.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for generating an outline for a writing via a voice conversation session, comprising:
   a processor; and
   a memory in communication with the processor, the memory comprising executable instructions that, when executed by the processor, cause the processor to control the system to perform functions of:
      receiving, from a user, a user input requesting to initiate a voice conversation session for generating an outline for a writing;
      in response to receiving the user input, generating a voice output asking a question regarding the writing;
      capturing a voice input from the user responding to the voice output;
      inputting, to a deep learning (DL) engine, the captured voice input from the user, the DL engine trained with data from a plurality of previous voice conversation sessions to perform:
         determine a relevancy of content of the captured voice input to the question asked in the voice output and an accuracy of the content of the captured voice input; and
         generate, based on the determined relevancy and accuracy of the content of the voice input, a follow-up question regarding the writing;
      extracting, from the DL engine, the follow-up question regarding the writing;
      generating a follow-up voice output asking the follow-up question extracted from the DL engine;
      repeating, until a predetermined condition is met, the functions of capturing the voice input, inputting the captured voice input to the DL engine, extracting the follow-up question from the DL engine, and generating the follow-up voice output; and
      in response to determining that the predetermined condition is met, generating, based on the content of the captured voice inputs, the outline for the writing.

2. The system of claim 1, wherein the instructions, when executed by the processor, further cause the processor to control the system to perform functions of:
   extracting, from the DL engine, the determined relevancy indicating that the content of the captured voice input is not relevant to the question in the preceding voice output; and
   generating another voice output indicating that the voice input is not relevant to the preceding voice output.

3. The system of claim 1, wherein the instructions, when executed by the processor, further cause the processor to control the system to perform functions of:
   extracting, from the DL engine, the determined accuracy indicating that the content of the captured voice input is not accurate; and
   generating another voice output indicating that the voice input is not accurate.

4. The system of claim 1, wherein:
   for generating the voice output, the instructions, when executed by the processor, further cause the processor to control the system to perform a function of generating a first voice output asking a first question regarding a type of the writing, and
   the DL engine is trained to determine, based on the captured voice input responding to the first voice output, the type of the writing.

5. The system of claim 4, wherein, for generating the follow-up voice output, the instructions, when executed by the processor, further cause the processor to control the system to perform a function of generating, in response to determining the type of writing, a second voice output asking a second question regarding a length of the writing.

6. The system of claim 5, wherein:
   the instructions, when executed by the processor, further cause the processor to control the system to perform functions of capturing another voice input responding to the second voice output and related to the length of the writing, and
   the DL engine is trained to perform:
      determining, based on the captured voice input responding to the second voice output, the predetermined condition comprising an amount of information to be collected from the user; and
      determining, based on the determined amount of information, whether the repeated functions of capturing the voice input, inputting the captured voice input to the DL engine, extracting the follow-up question from the DL engine and generating the follow-up voice output have met the predetermined condition.

7. The system of claim 1, wherein for generating the voice output, the instructions, when executed by the processor, further cause the processor to control the system to perform a function of generating a first voice output asking a first question related to a subject of the writing, a reason for selecting the subject of the writing, or an example of the reason.

8. A non-transitory computer readable medium containing instructions which, when executed by a processor, cause a system to perform functions of operating a writing assistant bot for generating an outline for a writing via a voice conversation session, the functions comprising:
   receiving, from a user, a user input requesting to initiate a voice conversation session for generating an outline for a writing;
   in response to receiving the user input, generating a voice output asking a question regarding the writing;
   capturing a voice input from the user responding to the voice output;
   inputting, to a deep learning (DL) engine, the captured voice input from the user, the DL engine trained with data from a plurality of previous voice conversation sessions to perform:
      determine a relevancy of content of the captured voice input to the question asked in the voice output and an accuracy of the content of the captured voice input; and
      generate, based on the determined relevancy and accuracy of the content of the voice input, a follow-up question regarding the writing;
   extracting, from the DL engine, the follow-up question regarding the writing;
   generating a follow-up voice output asking the follow-up question extracted from the DL engine;
   repeating, until a predetermined condition is met, the functions of capturing the voice input, inputting the captured voice input to the DL engine, extracting the follow-up question from the DL engine, and generating the follow-up voice output; and
   in response to determining that the predetermined condition is met, generating, based on the content of the captured voice inputs, the outline for the writing.

9. A method of operating a system for generating an outline for a writing via a voice conversation session, the method comprising:

receiving, from a user, a user input requesting to initiate a voice conversation session for generating an outline for a writing;

in response to receiving the user input, generating a voice output asking a question regarding the writing;

capturing receiving a voice input from the user responding to the voice output;

inputting, to a deep learning (DL) engine, the captured voice input from the user, the DL engine trained with data from a plurality of previous voice conversation sessions to perform:

determine a relevancy of content of the captured voice input to the question asked in the voice output and an accuracy of the content of the captured voice input; and generate, based on the determined relevancy and accuracy of the content of the voice input, a follow-up question regarding the writing;

extracting, from the DL engine, the follow-up question regarding the writing;

generating a follow-up voice output asking the follow-up question extracted from the DL engine;

repeating, until a predetermined condition is met, the steps of capturing the voice input, inputting the captured voice input to the DL engine, extracting the follow-up question from the DL engine, and generating the follow-up voice output; and in response to determining that the predetermined condition is met, generating, based on the content of the captured voice inputs, the outline for the writing.

10. The method of claim 9, further comprising:

extracting, from the DL engine, the determined relevancy indicating that the content of the captured voice input is not relevant to the question in the preceding voice output; and generating another voice output indicating that the voice input is not relevant to the preceding voice output.

11. The method of claim 9, further comprising:

extracting, from the DL engine, the determined accuracy indicating that the content of the captured voice input is not accurate; and generating another voice output indicating that the voice input is not accurate.

12. The method of claim 9, wherein:

generating the voice output comprises generating a first voice output asking a first question regarding a type of the writing, and the DL engine is trained to determine, based on the captured voice input responding to the first voice output, the type of the writing.

13. The method of claim 12, wherein generating the follow-up voice output comprises generating, in response to determining the type of writing, a second voice output asking a second question regarding a length of the writing.

14. The method of claim 13, further comprising:

capturing another voice input responding to the second voice output and related to the length of the writing, wherein the DL engine is trained to perform:

determining, based on the captured voice input responding to the second voice output, the predetermined condition comprising an amount of information to be collected from the user; and determining, based on the determined amount of information, whether the repeated steps of capturing the voice input, inputting the captured voice input to the DL engine, extracting the follow-up question from the DL engine and generating the follow-up voice output have met the predetermined condition.

15. The method of claim 9, wherein generating the voice output comprises generating a first voice output asking a first question related to a subject of the writing, a reason for selecting the subject of the writing, or an example of the reason.

16. The method of claim 9, further comprising displaying, on display, the content of the captured voice input.

* * * * *